United States Patent
Chiang et al.

(10) Patent No.: US 8,638,043 B2
(45) Date of Patent: *Jan. 28, 2014

(54) TWO-TERMINAL CURRENT CONTROLLER AND RELATED LED LIGHTING DEVICE

(75) Inventors: Yung-Hsin Chiang, New Taipei (TW); Yi-Mei Li, New Taipei (TW)

(73) Assignee: IML International, Grand Cayman (KY)

( * ) Notice: Subject to any disclaimer, the term of this patent is extended or adjusted under 35 U.S.C. 154(b) by 274 days.

This patent is subject to a terminal disclaimer.

(21) Appl. No.: 13/052,132

(22) Filed: Mar. 21, 2011

(65) Prior Publication Data

US 2012/0139448 A1 Jun. 7, 2012

(30) Foreign Application Priority Data

Dec. 7, 2010 (TW) ................................ 99142624 A

(51) Int. Cl.
*H05B 37/02* (2006.01)
(52) U.S. Cl.
USPC .......................... 315/291; 315/307; 315/308
(58) Field of Classification Search
USPC .......... 315/200 R, 209 R, 224–226, 291, 307, 315/308, 312
See application file for complete search history.

(56) References Cited

U.S. PATENT DOCUMENTS

| | | | |
|---|---|---|---|
| 7,683,553 B2 | 3/2010 | Fong | |
| 8,183,795 B2 | 5/2012 | Huang | |
| 8,299,724 B2 * | 10/2012 | Huynh | ........................ 315/291 |
| 2006/0267514 A1 | 11/2006 | Xu | |
| 2008/0001547 A1 | 1/2008 | Negru | |
| 2009/0322235 A1 | 12/2009 | Shiu | |
| 2011/0273112 A1 | 11/2011 | Lee | |
| 2011/0279044 A1* | 11/2011 | Maiw | ........................... 315/186 |

FOREIGN PATENT DOCUMENTS

| | | |
|---|---|---|
| JP | 2006244848 A | 9/2006 |
| JP | 200859811 A | 3/2008 |
| JP | 2008130377 A | 6/2008 |
| JP | 2009134933 | 6/2009 |
| JP | 201165922 A | 3/2011 |
| JP | 2011524621 A | 9/2011 |
| KR | 1020110023551 A | 3/2011 |
| KR | 101132194 B1 | 4/2012 |
| TW | 200850048 | 12/2008 |
| TW | 201004471 | 1/2010 |
| TW | 201136443 | 10/2011 |
| WO | 2009153696 A1 | 12/2009 |
| WO | 2011058805 A1 | 5/2011 |
| WO | 2013011924 A1 | 1/2013 |

OTHER PUBLICATIONS

U.S. Appl. No. 13/743,345, filed Jan. 17, 2013.*

* cited by examiner

*Primary Examiner* — Jimmy Vu
(74) *Attorney, Agent, or Firm* — Winston Hsu; Scott Margo

(57) ABSTRACT

A two-terminal current controller having a current limiting unit and an adjusting unit regulates a first current flowing through a load according to a load voltage. When the load voltage does not exceed a first voltage, the two-terminal current controller operates in a first mode for conducting a second current associated a rectified AC voltage, thereby limiting the first current to zero and adjusting the second current accordingly. When the load voltage is between the first voltage and a second voltage, the two-terminal current controller operates in a second mode for conducting the second current, thereby limiting the first current to zero and limiting the second current to a constant value larger than zero. When the load voltage exceeds the second voltage, the two-terminal current controller operates in a third mode for turning off the current limiting unit. The adjusting unit can adjust the predetermined value and the second voltage.

28 Claims, 20 Drawing Sheets

United States Patent US 8,638,043 B2

TWO-TERMINAL CURRENT CONTROLLER AND RELATED LED LIGHTING DEVICE

BACKGROUND OF THE INVENTION

1. Field of the Invention

The present invention is related to a two-terminal current controller and related LED lighting device, and more particularly, to a two-terminal current controller and related LED lighting device with high power factor.

2. Description of the Prior Art

Compared to traditional incandescent bulbs, light-emitting diodes (LEDs) are advantageous in low power consumption, long lifetime, small size, no warm-up time, fast reaction speed, and the ability to be manufactured as small or array devices. In addition to outdoor displays, traffic signs, and LCD backlight for various electronic devices such as mobile phones, notebook computers or televisions, LEDs are also widely used as indoor/outdoor lighting devices in place of fluorescent or incandescent lamps.

FIG. 1 is a diagram illustrating the voltage-current chart of a light-emitting diode. When the forward-bias voltage of the light-emitting diode is smaller than its barrier voltage Vb, the light-emitting diode functions as an open-circuited device since it only conducts a negligible amount of current. When the forward-bias voltage of the light-emitting diode exceeds its barrier voltage Vb, the light-emitting diode functions as a short-circuited device since its current increases exponentially with the forward-bias voltage. The barrier voltage Vb, whose value is related to the material and doping type of the light-emitting diode, is typically between 1.5 and 3.5 volts. For most current values, the luminescence of the light-emitting diode is proportional to the current. Therefore, a current source is generally used for driving light-emitting diodes in order to provide uniform luminescence.

FIG. 2 is a diagram of a prior art LED lighting device 600. The LED lighting device 600 includes a power supply circuit 110, a resistor R and a luminescent device 10. The power supply circuit 110 is configured to receive an alternative-current (AC) voltage VS having positive and negative periods and convert the output of the AC voltage VS in the negative period using a bridge rectifier 112, thereby providing a rectified AC voltage $V_{AC}$ for driving the luminescent device 10. The resistor R is coupled in series with the luminescent device 10 for regulating its current $I_{LED}$. In many applications, multiple light-emitting diodes are required in order to provide sufficient brightness. Since a light-emitting diode is a current-driven device whose luminescence is proportional to its driving current, the luminescent device 10 normally adopts a plurality of light-emitting diodes $D_1$-$D_n$ coupled in series. Assuming that the barrier voltage of all the light-emitting diodes $D_1$-$D_n$ is equal to the ideal value Vb and the rectified AC voltage $V_{AC}$ periodically varies between 0 and $V_{MAX}$, a forward-bias voltage larger than n*Vb is required for turning on the luminescent device 10. Therefore, the energy between 0 and n*Vb can not be used. As the number of the light-emitting diodes $D_1$-$D_n$ increases, a higher forward-bias voltage is required for turning on the luminescent device 10; as the number of the light-emitting diodes $D_1$-$D_n$ decreases, the large driving current when $V_{AC}$=$V_{MAX}$ may impact the reliability of the light-emitting diodes. Therefore, the prior art LED lighting device 600 needs to make compromise between the effective operational voltage range and the reliability. Meanwhile, the current-limiting resistor R also consumes extra power and may thus lower system efficiency.

FIG. 3 is a diagram of another prior art LED lighting device 700. The LED lighting device 700 includes a power supply circuit 110, an inductor L, a capacitor C, a switch SW, and a luminescent device 10. The power supply circuit 110 is configured to receive an AC voltage VS having positive and negative periods and convert the output of the AC voltage VS in the negative period using a bridge rectifier 112, thereby providing a rectified AC voltage $V_{AC}$ for driving the luminescent device 10. The inductor L and the switch SW are coupled in series with the luminescent device 10 for limiting its current $I_{LED}$. The capacitor C is coupled in parallel with the luminescent device 10 for absorbing voltage ripples of the power supply circuit 110. For the same current-regulating function, the inductor L consumes less energy than the resistor R of the LED lighting device 600. However, the inductor L for regulating current and the capacitor for stabilizing voltage largely reduce the power factor of the LED lighting device 700 and the energy utilization ratio. Therefore, the prior art LED lighting device 700 needs to make compromise between the effective operational voltage range and the brightness.

SUMMARY OF THE INVENTION

The present invention provides an LED lighting device comprising a luminescent device configured to provide light according to a first current and a two-terminal current controller coupled in parallel with the luminescent device and configured to regulate the first current according to a voltage established across the luminescent device. During a rising period of a rectified AC voltage when the voltage established across the luminescent device does not exceed a first voltage, the two-terminal current controller operates in a first mode. During the rising period when the voltage established across the luminescent device exceeds the first voltage but does not exceed a second voltage, the two-terminal current controller operates in a second mode. During the rising period when the voltage established across the luminescent device exceeds the second voltage, the two-terminal current controller operates in a third mode. The two-terminal current controller includes a current limiting unit and an adjusting unit. The current limiting unit is configured to conduct a second current associated with the rectified AC voltage, regulate the second current according to the voltage established across the luminescent device and maintain the first current at zero when the two-terminal current controller operates in the first mode; conduct the second current, maintain the second current at a first predetermined value larger than zero and maintain the first current at zero when the two-terminal current controller operates in the second mode; and switch off when the two-terminal current controller operates in the third mode. The adjusting unit is configured to adjust the first predetermined value and the second voltage.

The present invention also provides two-terminal current controller for controlling a first current passing through a load. During a rising period of a rectified AC voltage when a voltage established across the load does not exceed a first voltage, the two-terminal current controller operates in a first mode. During the rising period when the voltage established across the load exceeds the first voltage but does not exceed a second voltage, the two-terminal current controller operates in a second mode. During the rising period when the voltage established across the load exceeds the second voltage, the two-terminal current controller operates in a third mode. The two-terminal current controller includes a current limiting unit and an adjusting unit. The current limiting unit is configured to conduct a second current associated with the rectified AC voltage, regulate the second current according to the voltage established across the load and maintain the first current at zero when the two-terminal current controller operates in the first mode; conduct the second current, maintain the second current at a predetermined value larger than zero and maintain the first current at zero when the two-terminal current controller operates in the second mode; and switch off when the two-terminal current controller operates in the third mode. The adjusting unit is configured to adjust the predetermined value and the second voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
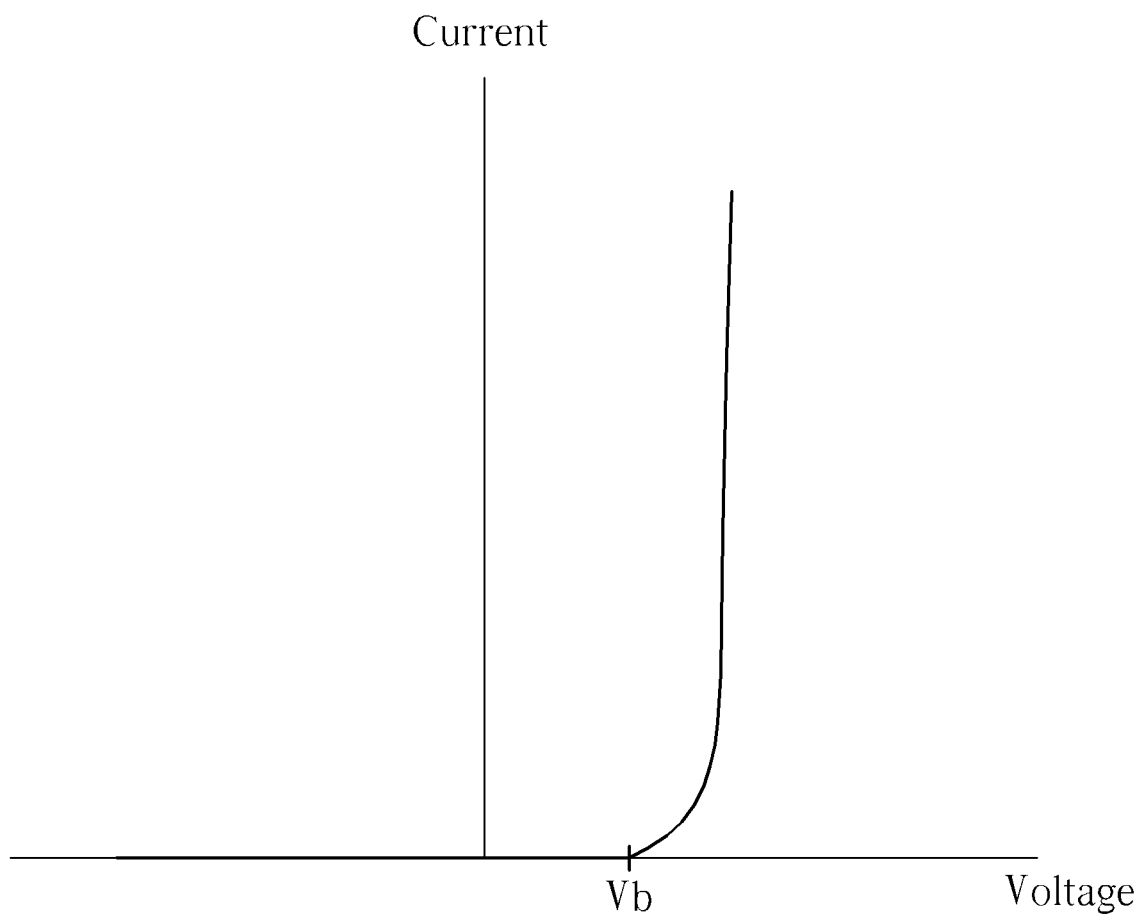
FIG. 1 is a diagram illustrating the voltage-current chart of a light-emitting diode.
Figure 2:
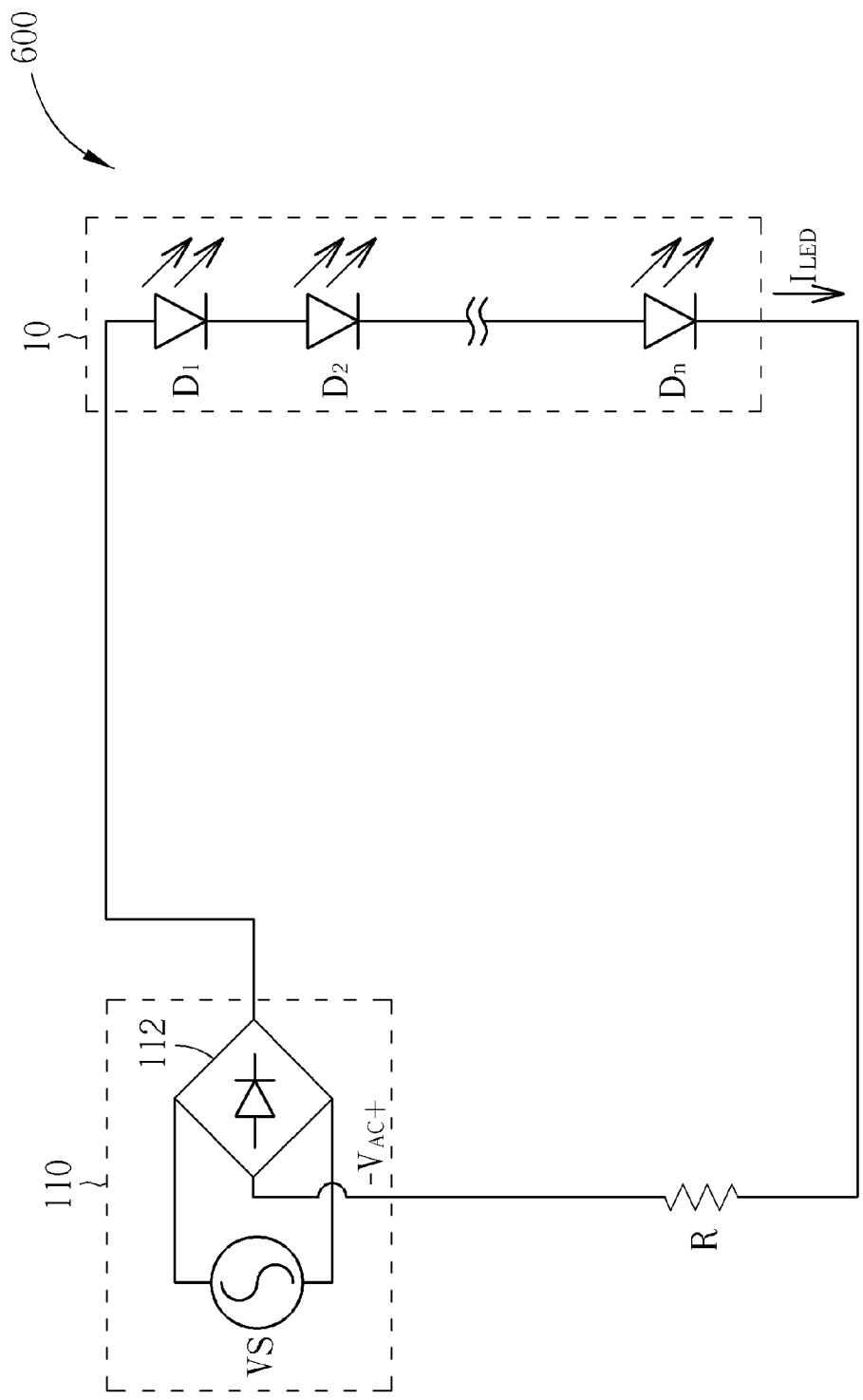
FIGS. 2 and 3 are diagrams of prior art LED lighting devices.
Figure 3:
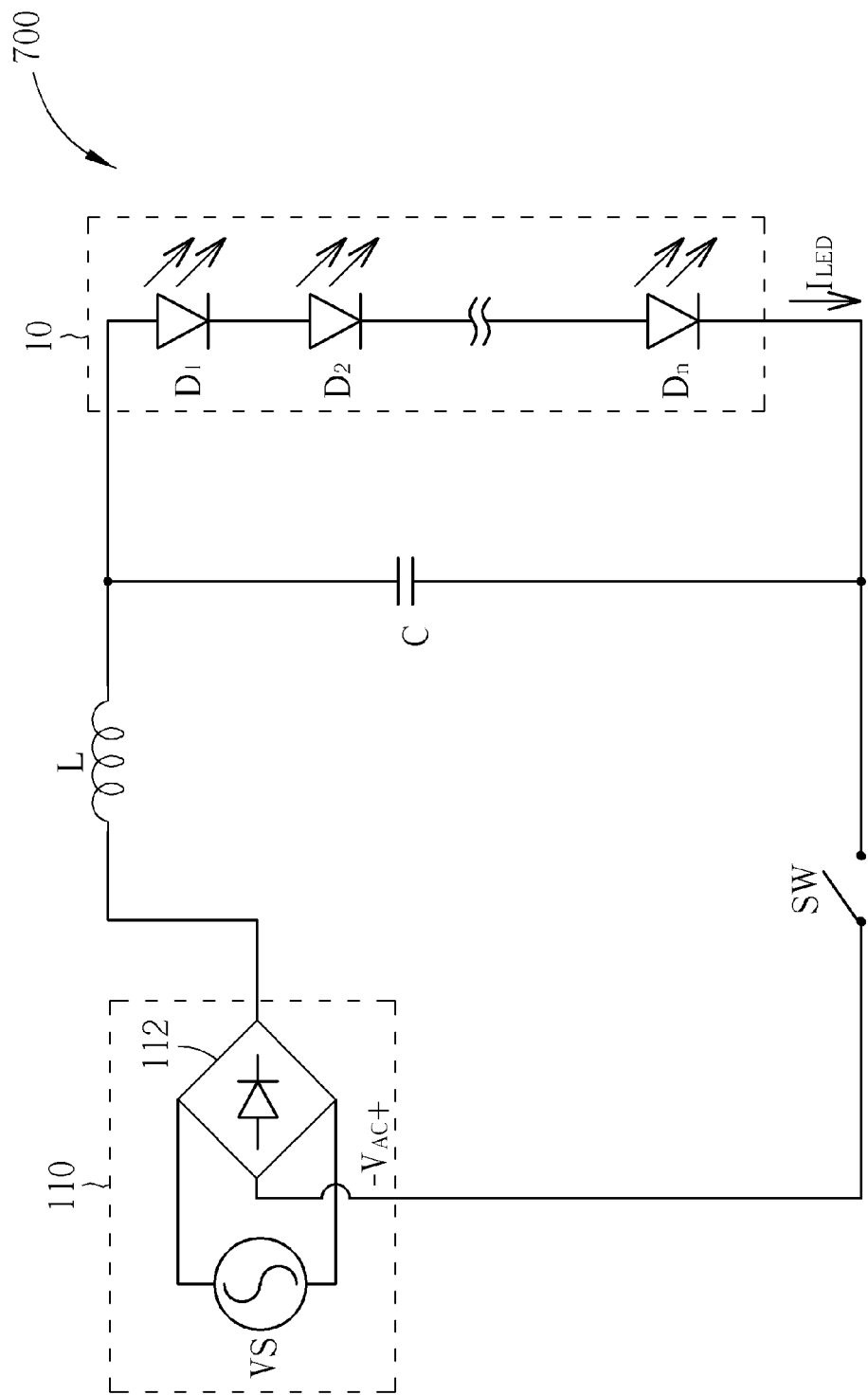
Figure 4:
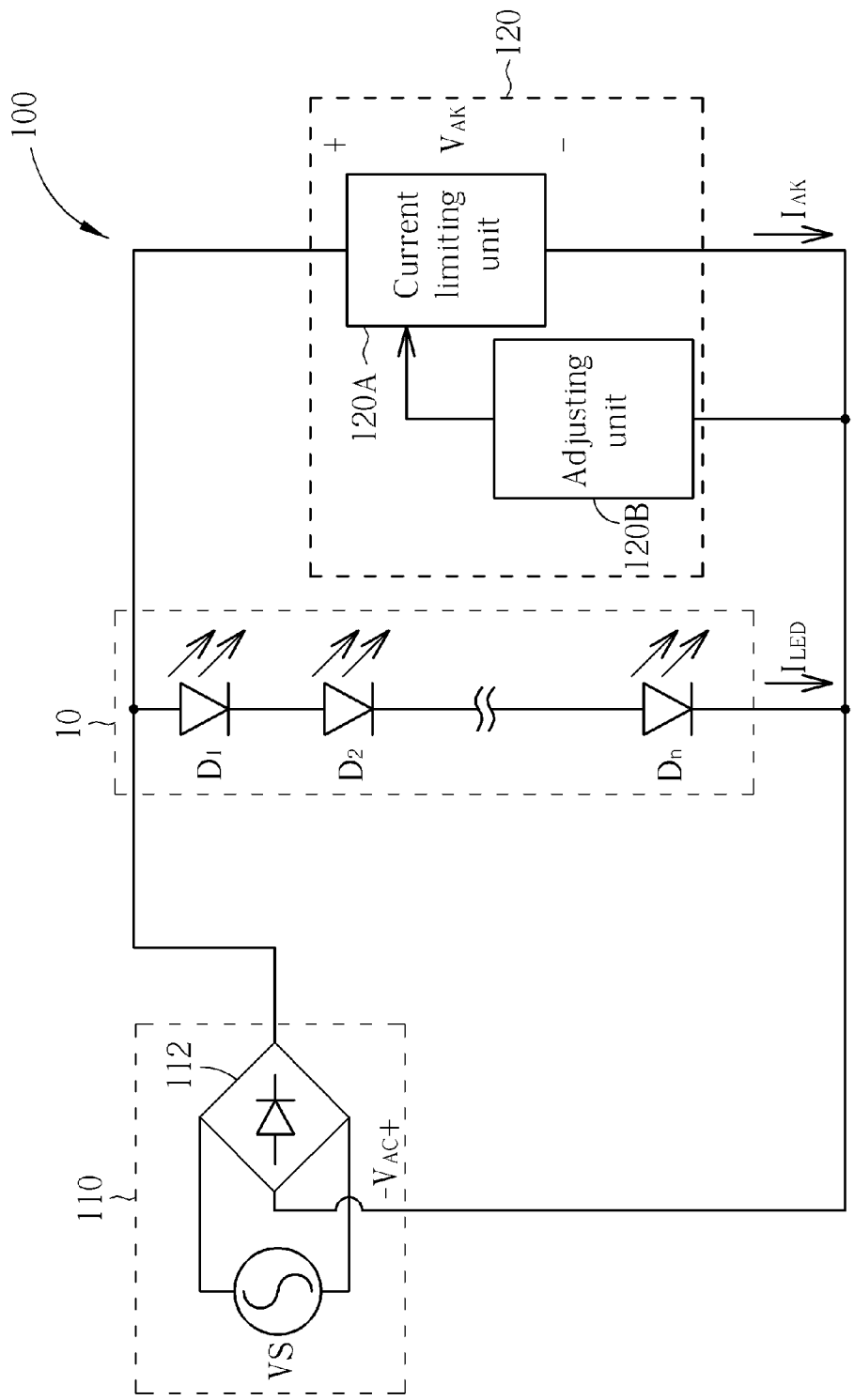
FIGS. 4, 7, 10, 13 and 15 are diagrams of LED lighting devices according to embodiments of the present invention.

FIG. 4 is a diagram of an LED lighting device 100 according to a first embodiment of the present invention. The LED lighting device 100 includes a power supply circuit 110, a two-terminal current controller 120, and a luminescent device 10. The power supply circuit 110 is configured to receive an AC voltage VS having positive and negative periods and convert the output of the AC voltage VS in the negative period using a bridge rectifier 112, thereby providing a rectified AC voltage $V_{AC}$, whose value varies periodically with time, for driving the luminescent device 10. The luminescent device 10 may adopt n light-emitting units $D_1$-$D_n$ coupled in series, each of which may include a single light-emitting diode or multiple light-emitting diodes. FIG. 4 depicts the embodiment using a single light-emitting diode in which $I_{LED}$ represents the current passing through the luminescent device 10 and $V_{AK}$ represents the voltage established across the luminescent device 10. The two-terminal current controller 120, coupled in parallel with the luminescent device 10 and the power supply circuit 110, includes a current limiting unit 120A and an adjusting unit 120B. The two-terminal current controller 120 is configured to control the current $I_{LED}$ passing through the luminescent device 10 according to the rectified AC voltage $V_{AC}$, wherein $I_{AK}$ represents the current passing through the current limiting unit 120A and $V_{AK}$ represents the voltage established across the current limiting unit 120A. In the first embodiment of the present invention, the barrier voltage Vb' of the two-terminal current controller 120 is smaller than the overall barrier voltage n*Vb of the luminescent device 10 (assuming the barrier voltage of each light-emitting unit is equal to Vb).

Figure 5:
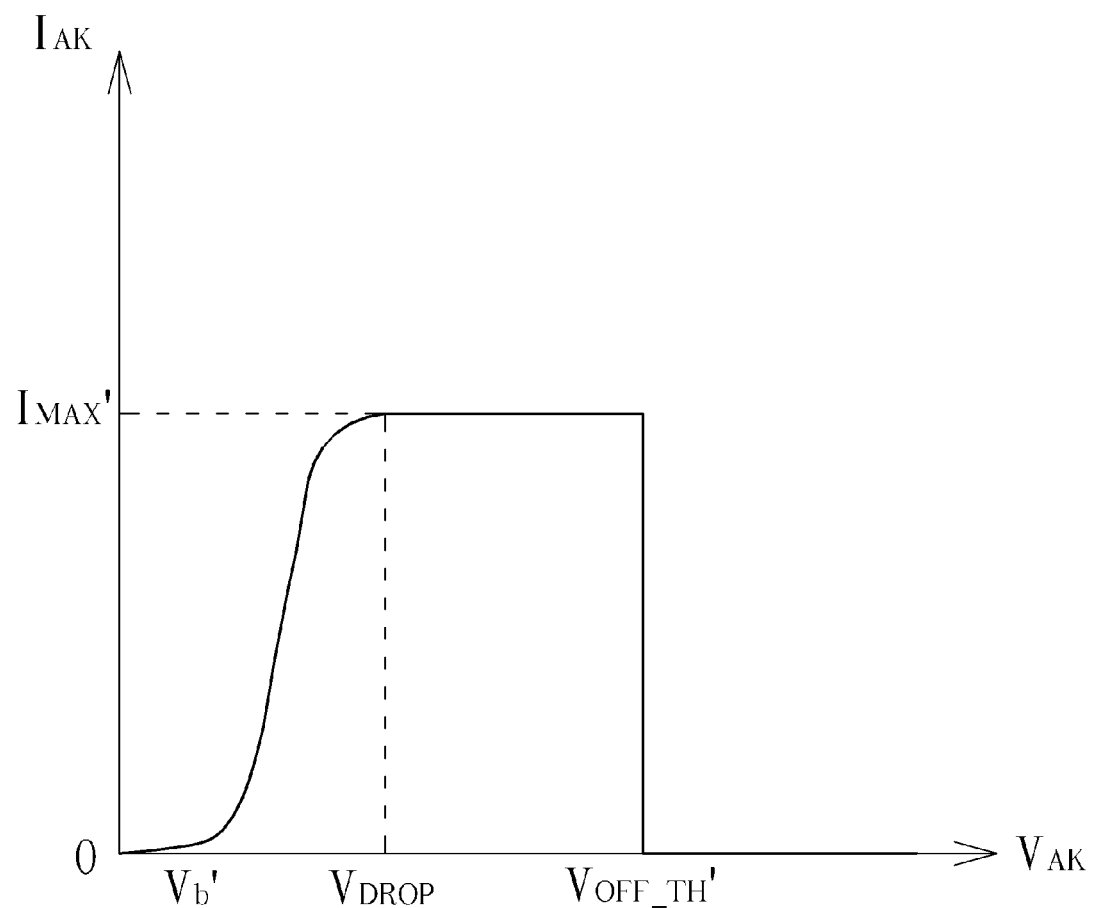
FIGS. 5, 8 and 11A-11D are diagrams illustrating the current-voltage chart of a two-terminal current controller according to the present invention.
Figure 6:
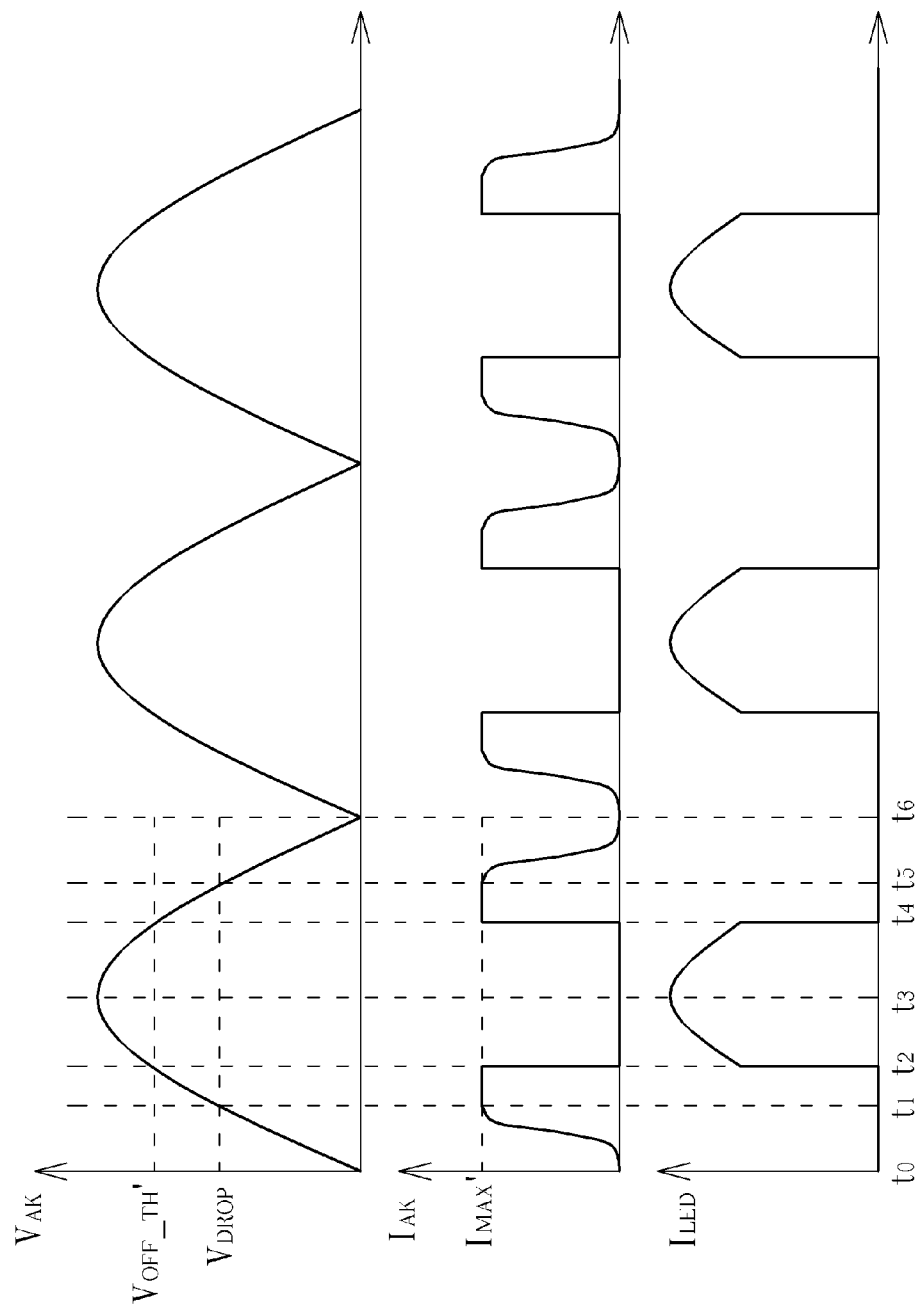
FIGS. 6, 9, 12 and 14 are diagrams illustrating the variations in the related current and voltage when operating the LED lighting device of the present invention.

FIGS. 5 and 6 illustrate the operation of the LED lighting device 100, wherein FIG. 5 is a diagram illustrating the current-voltage chart of the two-terminal current controller 120, and FIG. 6 is a diagram illustrating the variations in the related current and voltage when operating the LED lighting device 100. In FIG. 5, the vertical axis represents the current $I_{AK}$ passing through the current limiting unit 120A, and the horizontal axis represents the voltage $V_{AK}$ established across the current limiting unit 120A. In the first embodiment of the present invention, the two-terminal current controller 120 operates in a first mode in which the current limiting unit 120A functions as a voltage-controlled device when $0<V_{AK}<V_{DROP}$. In other words, when the voltage $V_{AK}$ exceeds the barrier voltage Vb' of the two-terminal current controller 120, the current $I_{AK}$ changes with the voltage $V_{AK}$ in a specific manner. The two-terminal current controller 120 operates in a second mode in which the current limiting unit 120A functions as a constant current source when $V_{DROP}<V_{AK}<V_{OFF\_TH}'$. In other words, the current $I_{AK}$ is maintained at an adjustable specific current $I_{MAX}'$ instead of changing with the voltage $V_{AK}$. The two-terminal current controller 120 functions in a third mode in which the current limiting unit 120A is turned off when $V_{AK}>V_{OFF\_TH}'$. In other words, the two-terminal current controller 120 functions as an open-circuited device since the current $I_{AK}$ is suddenly reduced to zero. Meanwhile, the adjusting unit 120B may provide flexible designs with various characteristics by adjusting the value of $I_{MAX}'$ when the two-terminal current controller 120 operates in the second mode and the value of $V_{OFF\_TH}'$ for switching between the second mode and the third mode.

FIG. 6 illustrates the waveforms of the voltage $V_{AK}$, the current $I_{AK}$ and the current $I_{LED}$. Since the voltage $V_{AK}$ is associated with the rectified AC voltage $V_{AC}$ whose value varies periodically with time, a cycle between $t_0$-$t_6$ is used for illustration, wherein the period between $t_0$-$t_3$ is the rising period of the rectified AC voltage $V_{AC}$ and the period between $t_4$-$t_6$ is the falling period of the rectified AC voltage $V_{AC}$. Between $t_0$-$t_1$ when the voltage $V_{AK}$ gradually increases, the current limiting unit 120A of the two-terminal current controller 120 is first turned on, after which the current $I_{AK}$ increases with the voltage $V_{AK}$ in a specific manner and the current $I_{LED}$ is maintained at zero. Between $t_1$-$t_2$ when the voltage $V_{AK}$ is larger than the voltage $V_{DROP}$, the current limiting unit 120A of the two-terminal current controller 120 is configured to limit the current $I_{AK}$ to a specific current $I_{MAX}'$, and the current $I_{LED}$ remains zero since the luminescent device 10 is still turned off. Between $t_2$-$t_4$ when the voltage $V_{AK}$ is larger than the voltage $V_{OFF\_TH}'$, the current limiting unit 120A of the two-terminal current controller 120 is turned off and the current associated with the rectified AC voltage $V_{AC}$ thus flows through the luminescent device 10. Therefore, the current $I_{AK}$ is reduced to zero, and the current $I_{LED}$ changes with the voltage $V_{AK}$. Between $t_4$-$t_5$ when the voltage $V_{AK}$ drops to a value between the voltage $V_{DROP}$ and the voltage $V_{OFF\_TH}'$, the current limiting unit 120A of the two-terminal current controller 120 is turned on, thereby limiting the current $I_{AK}$ to the specific current $I_{MAX}'$ and maintaining the current $I_{LED}$ at zero again. Between $t_5$-$t_6$ when the voltage $V_{AK}$ drops below the voltage $V_{DROP}$, the current $I_{AK}$ decreases with the voltage $V_{AK}$ in a specific manner. In other words, the two-terminal current controller 120 operates in the first mode during $t_0$-$t_1$ and $t_5$-$t_6$ when $0<V_{AK}<V_{DROP}$; the two-terminal current controller 120 operates in the second mode during $t_1$-$t_2$ and $t_4$-$t_5$ when $V_{DROP}<V_{AK}<V_{OFF\_TH}'$; the two-terminal current controller 120 operates in the third mode during $t_2$-$t_4$ when $V_{AK}>V_{OFF\_TH}'$.

Figure 7:
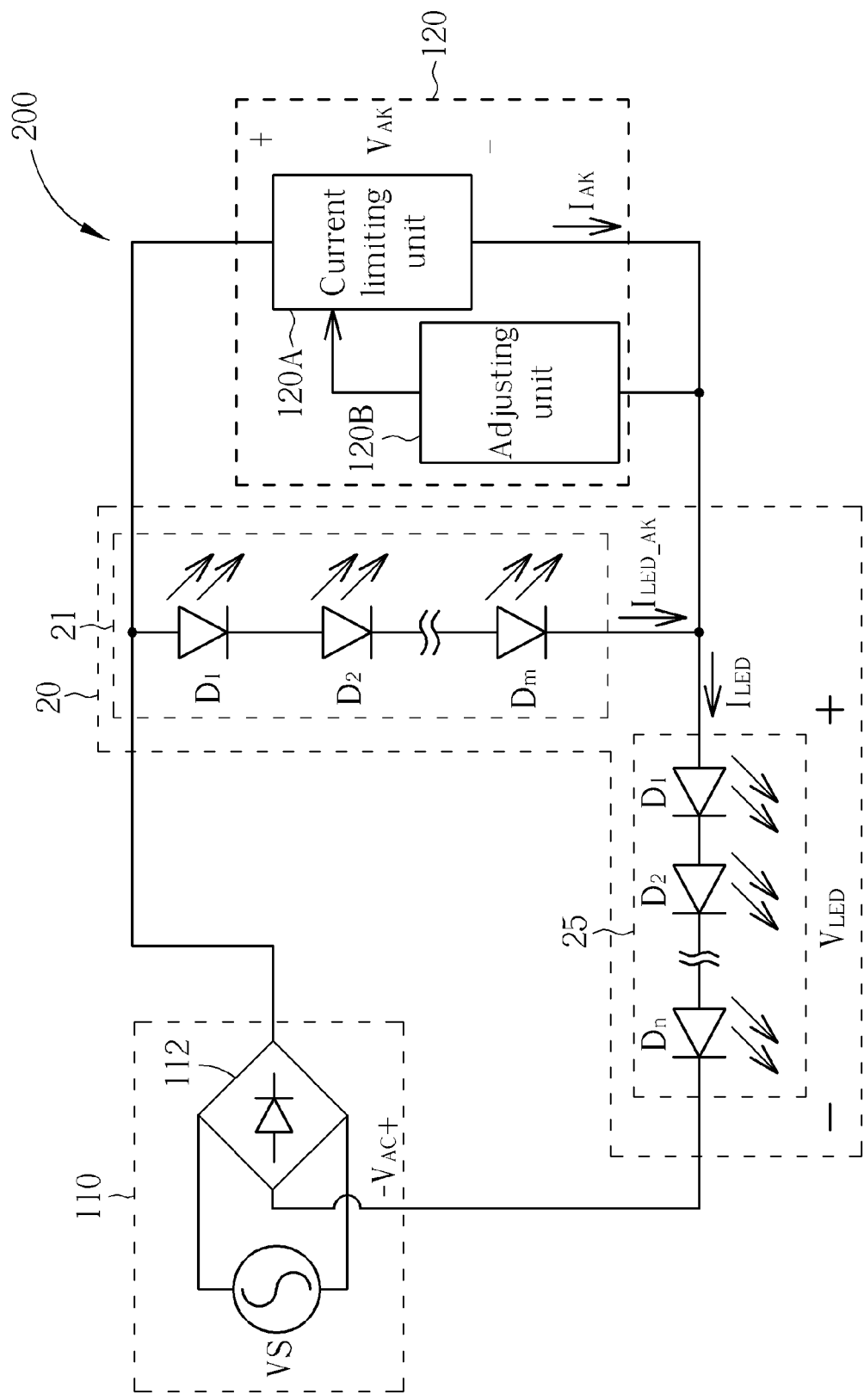

FIG. 7 is a diagram of an LED lighting device 200 according to a second embodiment of the present invention. The LED lighting device 200 includes a power supply circuit 110, a two-terminal current controller 120, and a luminescent device 20. Having similar structures, the first and second embodiments of the present invention differ in the luminescent device 20 and how it is connected to the two-terminal current controller 120. In the second embodiment of the present invention, the luminescent device 20 includes two luminescent elements 21 and 25: the luminescent element 21 is coupled in parallel to the two-terminal current controller 120 and includes m light-emitting units $D_1$-$D_m$ coupled in series, wherein $I_{LED\_AK}$ represents the current flowing through the luminescent element 21 and $V_{AK}$ represents the voltage established across the luminescent element 21; the luminescent element 25 is coupled in series to the two-terminal current controller 120 and includes n light-emitting units $D_1$-$D_n$ coupled in series, wherein $I_{LED}$ represents the current flowing through the luminescent element 25 and $V_{LED}$ represents the voltage established across the luminescent element 25. Each light-emitting unit may include a single light-emitting diode or multiple light-emitting diodes. FIG. 7 depicts the embodiment using a single light-emitting diode. The two-terminal current controller 120 is configured to regulate the current flowing through the luminescent device 20 according to the rectified AC voltage $V_{AC}$, wherein $I_{AK}$ represents the current flowing through the current limiting unit 120A and $V_{AK}$ represents the voltage established across the current limiting unit 120A. In the second embodiment of the present invention, the barrier voltage Vb' of the current limiting unit 120A is smaller than the overall barrier voltage m*Vb of the luminescent element 21 (assuming the barrier voltage of each luminescent element is equal to Vb).

Figure 8:
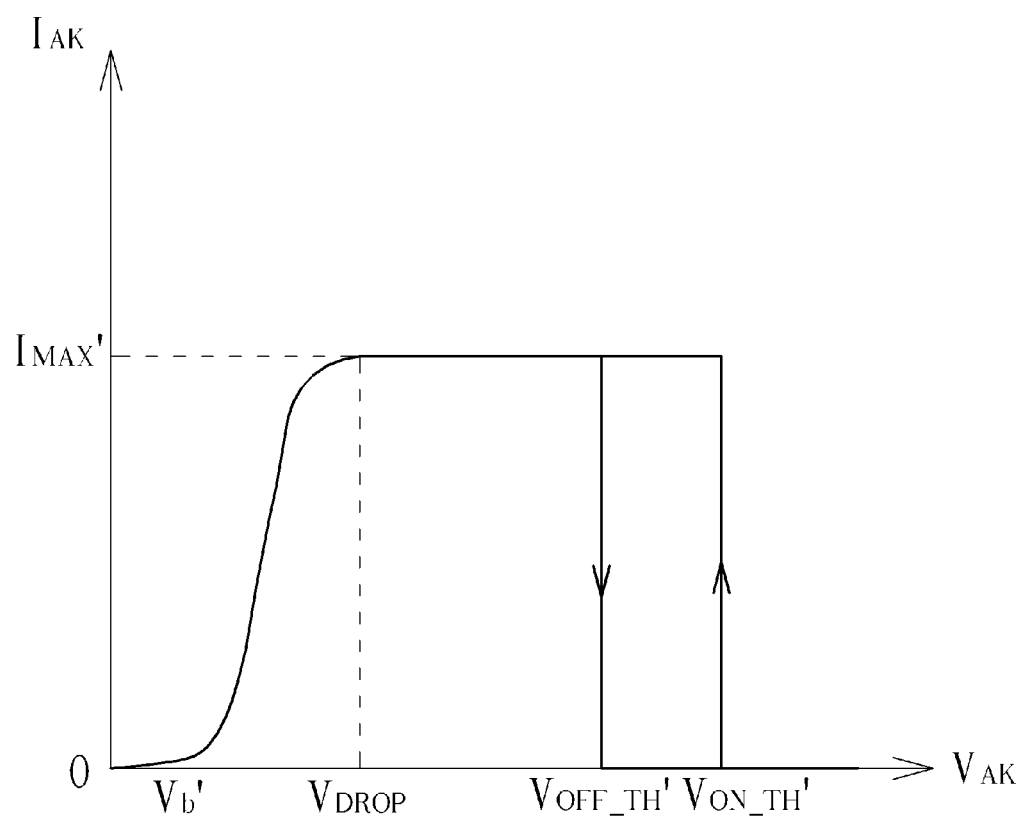
Figure 9:
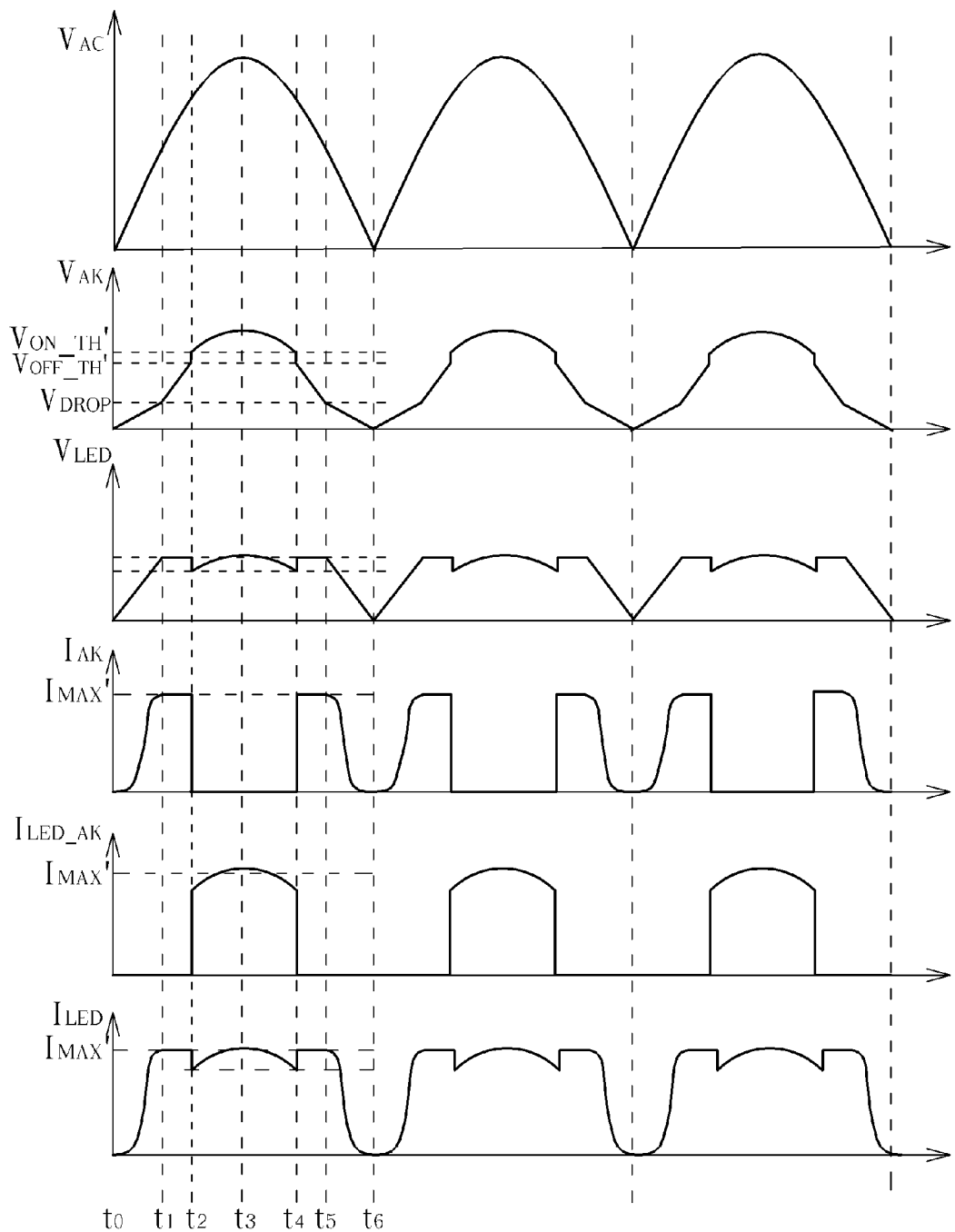

FIGS. 8 and 9 illustrate the operation of the LED lighting device 200 according to the second embodiment of the present invention, wherein FIG. 8 is a diagram illustrating the current-voltage chart of the two-terminal current controller 120, and FIG. 9 is a diagram illustrating the variations in the related current and voltage when operating the LED lighting device 200. In FIG. 8, the vertical axis represents the current $I_{AK}$ passing through the current limiting unit 120A, and the horizontal axis represents the voltage $V_{AK}$ established across the two-terminal current controller 120.

During the rising period of the rectified AC voltage $V_{AC}$, the two-terminal current controller 120 operates in the first mode in which the current limiting unit 120A functions as a voltage-controlled device when $0<V_{AK}<V_{DROP}$. In other words, when the voltage $V_{AK}$ exceeds the barrier voltage Vb' of the two-terminal current controller 120, the current $I_{AK}$ changes with the voltage $V_{AK}$ in a specific manner. The two-terminal current controller 120 operates in the second mode in which the current limiting unit 120A functions as a constant current source when $V_{DROP}<V_{AK}<V_{OFF\_TH}'$. In other words, the current $I_{AK}$ is maintained at an adjustable specific current $I_{MAX}'$ instead of changing with the voltage $V_{AK}$. The two-terminal current controller 120 operates in the third mode in which the current limiting unit 120A is turned off when $V_{AK}>V_{OFF\_TH}'$. In other words, the two-terminal current controller 120 functions as an open-circuited device since the current $I_{AK}$ is suddenly reduced to zero.

During the falling period of the rectified AC voltage $V_{AC}$, the two-terminal current controller 120 operates in the second mode in which the current limiting unit 120A is turned on for limiting the current $I_{AK}$ to the specific current $I_{MAX}'$ when $V_{AK}<V_{ON\_TH}'$. The two-terminal current controller 120 operates in the first mode in which the current limiting unit 120A functions as a voltage-controlled device when $0<V_{AK}<V_{DROP}$. In other words, when the voltage $V_{AK}$ exceeds the barrier voltage Vb' of the two-terminal current controller 120, the current $I_{AK}$ changes with the voltage $V_{AK}$ in a specific manner. Meanwhile, the adjusting unit 120B may provide flexible designs with various characteristics by adjusting the value of $I_{MAX}'$ when the two-terminal current controller 120 operates in the second mode and the value of $V_{OFF\_TH}'$ for switching between the second mode and the third mode.

FIG. 9 illustrates the waveforms of the voltage $V_{AC}$, $V_{AK}$, $V_{LED}$ and the current $I_{AK}$, $I_{LED\_AK}$ and $I_{LED}$. Since the rectified AC voltage $V_{AC}$ varies periodically with time, a cycle between $t_0$-$t_6$ is used for illustration, wherein the period between $t_0$-$t_3$ is the rising period of the rectified AC voltage $V_{AC}$ and the period between $t_4$-$t_6$ is the falling period of the rectified AC voltage $V_{AC}$. Between $t_0$-$t_1$, the voltage $V_{AK}$ established across the two-terminal current controller 120 and the voltage $V_{LED}$ established across the n serially-coupled light-emitting units $D_1$-$D_n$ increase with the rectified AC voltage $V_{AC}$. Due to smaller barrier voltage, the current limiting unit 120A of the two-terminal current controller 120 is first turned on, after which the current $I_{AK}$ and the current $I_{LED}$ increase with the voltage $V_{AK}$ in a specific manner and the current $I_{LED\_AK}$ is maintained at zero.

Between $t_1$-$t_2$ when the voltage $V_{AK}$ is larger than the voltage $V_{DROP}$, the two-terminal current controller 120 is configured to limit the current $I_{AK}$ to the specific current $I_{MAX}'$, and the current $I_{LED}$ remains zero since the luminescent element 21 is still turned off. With $V_F$ representing the forward-bias voltage of each light-emitting unit in the luminescent element 25, the value of the voltage $V_{LED}$ may be represented by m*$V_F$. Therefore, the luminescent element 21 is not conducting between $t_0$-$t_2$, and the rectified AC voltage $V_{AC}$ provided by the power supply circuit 110 is applied to the two-terminal current controller 120 and the n light-emitting units in the luminescent element 25.

Between $t_2$-$t_4$ when the voltage $V_{AK}$ is larger than the voltage $V_{OFF\_TH}'$, the two-terminal current controller 120 is turned off and the current associated with the rectified AC voltage $V_{AC}$ thus passes through the luminescent elements 21 and 25. The current $I_{AK}$ is reduced to zero, and the current $I_{LED\_AK}$ changes with the voltage $V_{AK}$. Therefore, when the luminescent element 21 is conducting between $t_2$ and $t_4$, the voltage $V_{AK}$ established across the two-terminal current controller 120 is supplied as the luminescent device 20 performs voltage dividing on the rectified AC voltage $V_{AC}$.

Between $t_4$-$t_5$ when the voltage $V_{AK}$ drops to a value between the voltage $V_{DROP}$ and the voltage $V_{ON\_TH}'$, the two-terminal current controller 120 is turned on, thereby limiting the current $I_{AK}$ to the specific current $I_{MAX}'$ and maintaining the current $I_{LED\_AK}$ at zero again. Between $t_5$-$t_6$ when the voltage $V_{AK}$ drops below the voltage $V_{DROP}$, the current $I_{AK}$ decreases with the voltage $V_{AK}$ in a specific manner. As depicted in FIGS. 7 and 9, the value of the current $I_{LED}$ is the sum of the current $I_{LED\_AK}$ and the current $I_{AK}$. The two-terminal current controller 120 according to the second embodiment of the present invention may increase the effective operational voltage range (such as the output of the rectified AC voltage $V_{AC}$ during $t_0$-$t_2$ and $t_4$-$t_6$), thereby increasing the power factor of the LED luminescence device 200.

Figure 10:
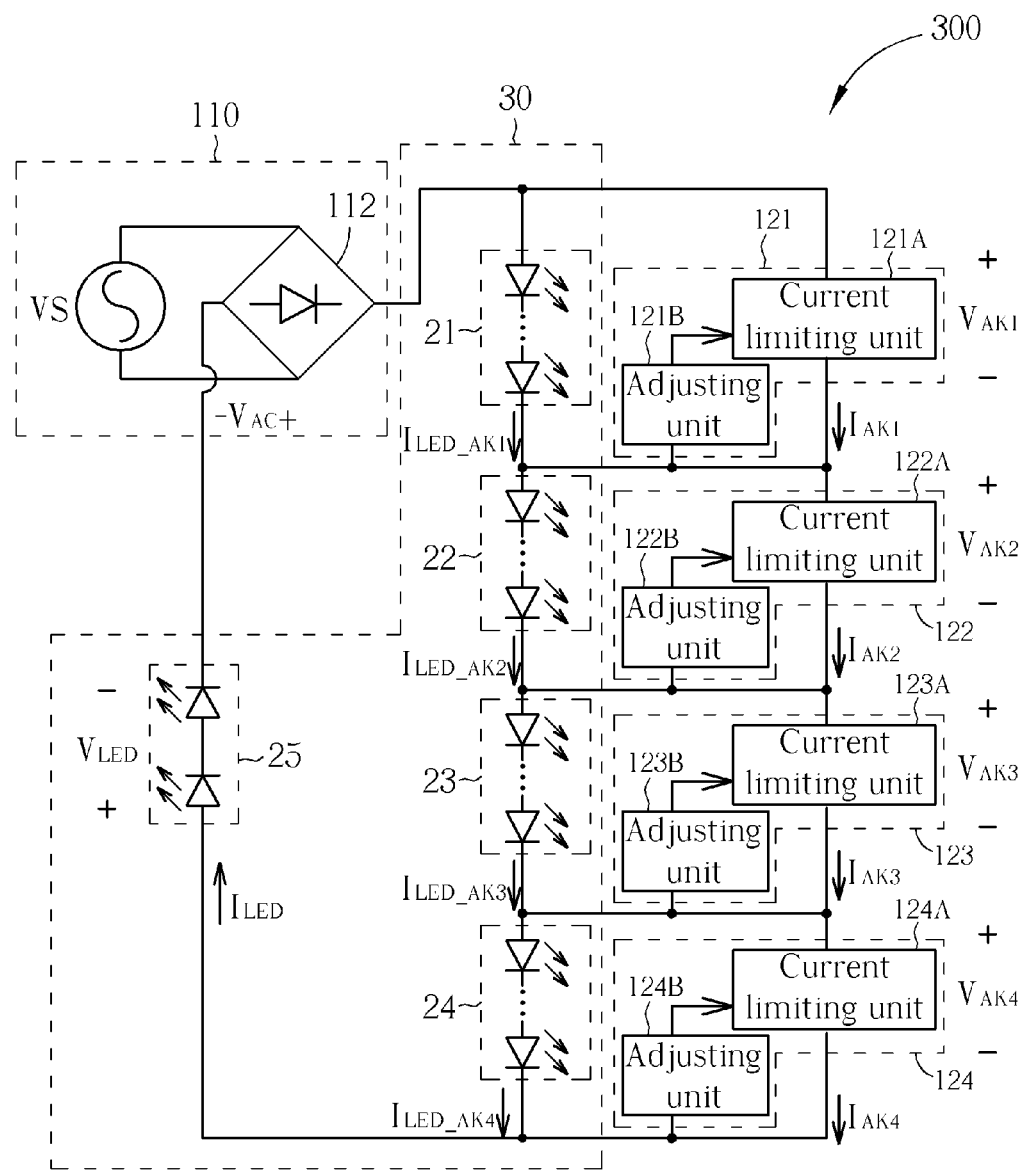
Figure 11A:
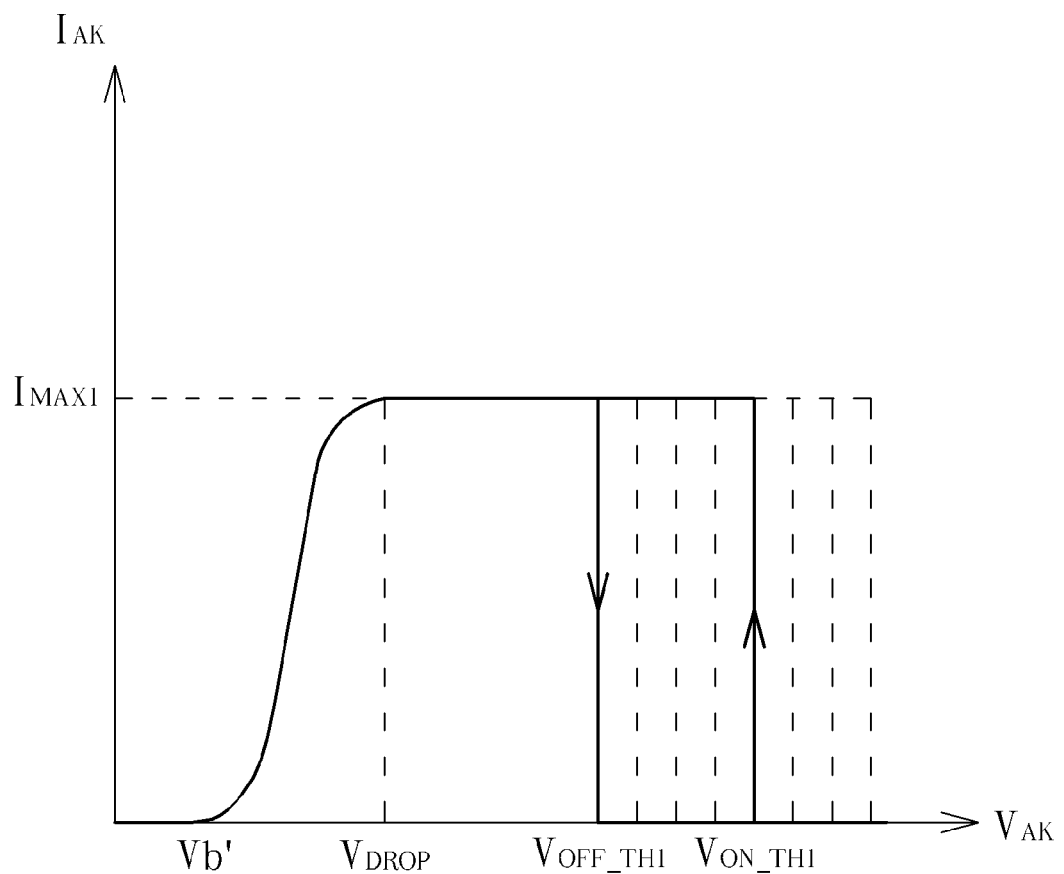
Figure 11B:
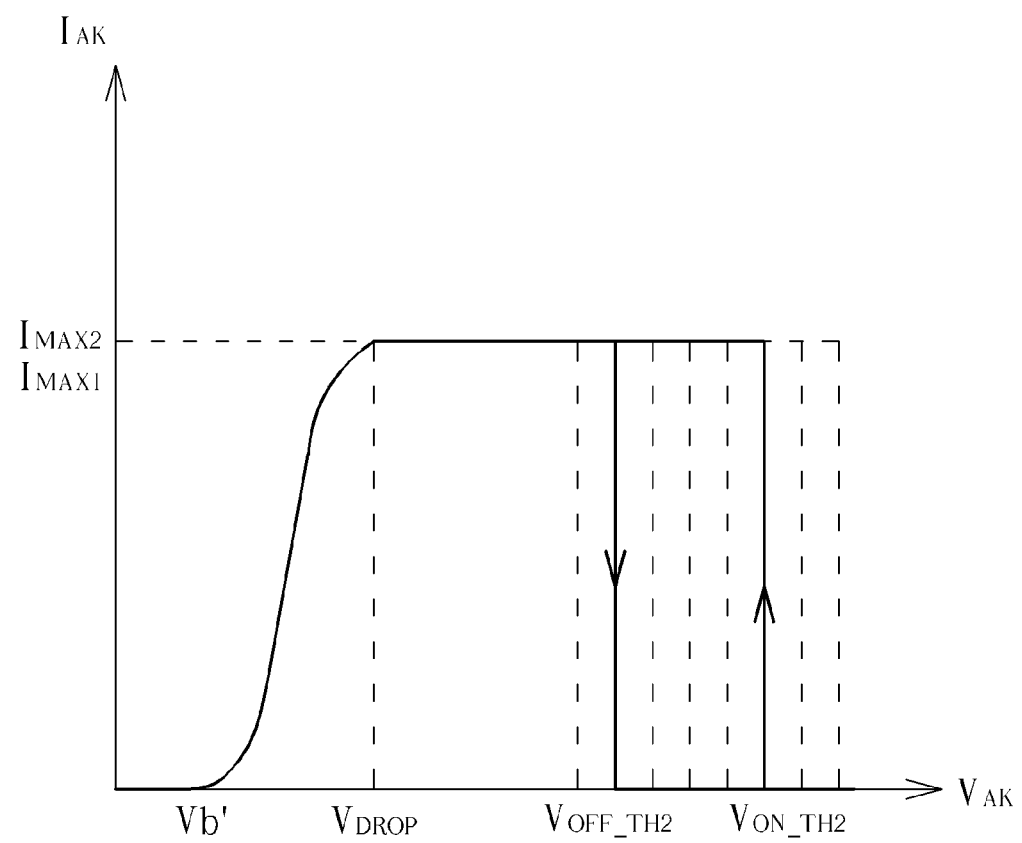
Figure 11C:
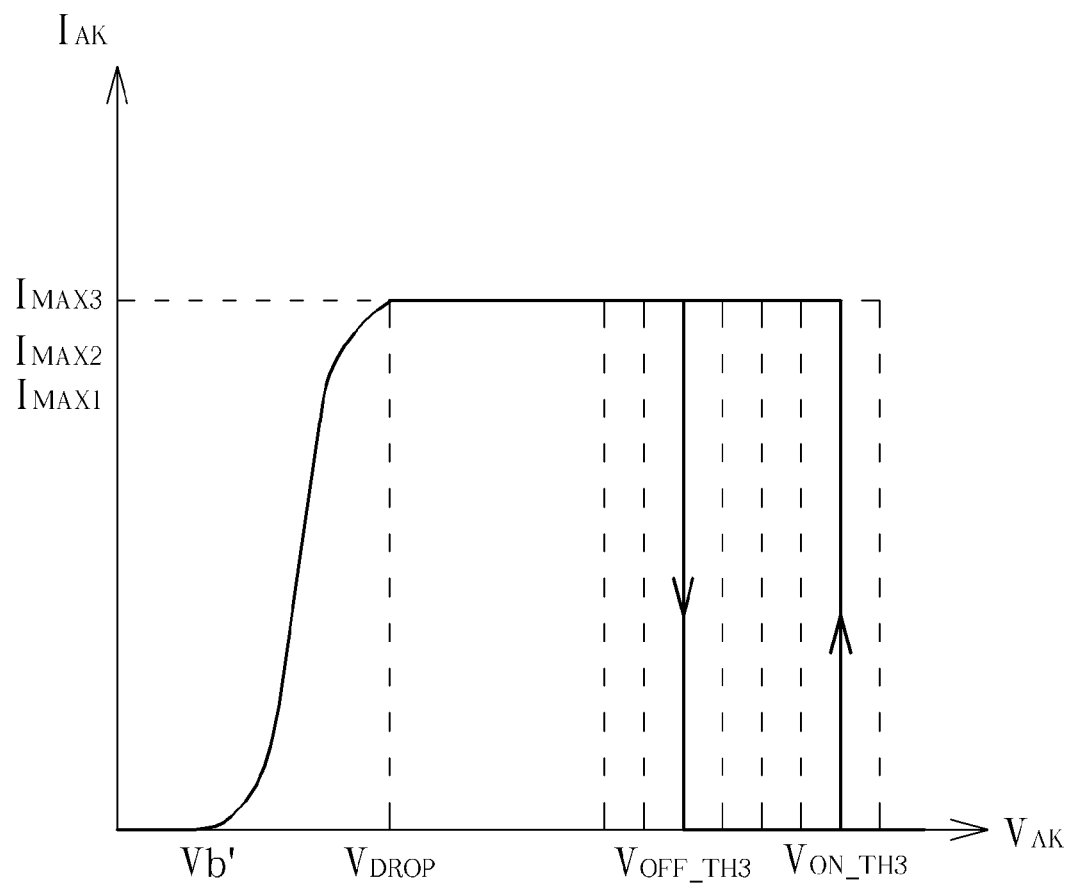
Figure 11D:
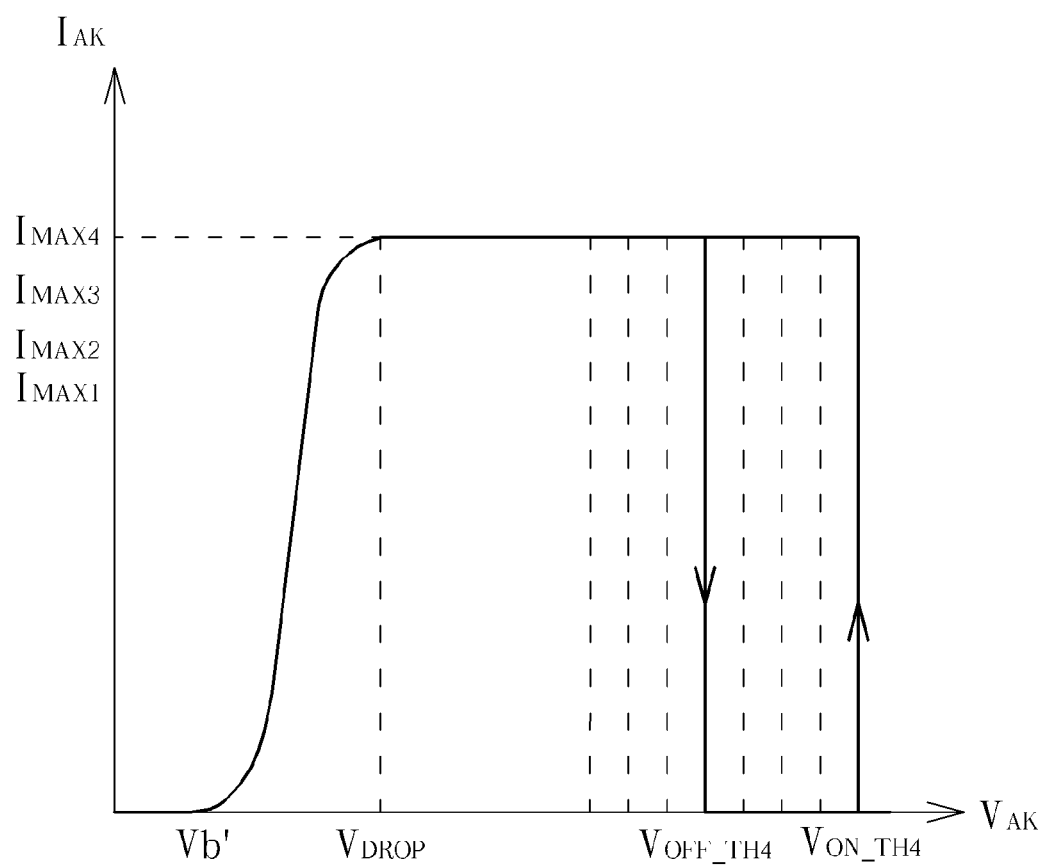

FIG. 10 is a diagram of an LED lighting device 300 according to a third embodiment of the present invention. The LED lighting device 300 includes a power supply circuit 110, a plurality of two-terminal current controllers, and a luminescent device 30. Having similar structures, the second and the third embodiments of the present invention differ in that the LED lighting device 300 includes a plurality of two-terminal current controllers (4 two-terminal current controllers 121-124 are depicted in FIG. 10 for illustration) and the luminescent device 30 includes a plurality of luminescent elements (5 luminescent elements 21-24 are depicted in FIG. 10 for illustration). The luminescent elements 21-24 are each coupled in parallel to the corresponding two-terminal current controllers 121-124 and each include a plurality of light-emitting units coupled in series, wherein $I_{LED\_AK1}$-$I_{LED\_AK4}$ respectively represent the currents flowing through the luminescent elements 21-24 and $V_{AK1}$-$V_{AK4}$ respectively represent the voltages established across the luminescent elements 21-24. The luminescent element 25 is coupled in series to the two-terminal current controllers 121-124 and includes a plurality of light-emitting units coupled in series, wherein $I_{LED}$ represents the current flowing through the luminescent element 25 and $V_{LED}$ represents the voltage established across the luminescent element 25. Each light-emitting unit may include a single light-emitting diode or multiple light-emitting diodes. FIG. 10 depicts the embodiment using a single light-emitting diode. In the embodiment illustrated in FIG. 10, the two-terminal current controllers 121-124, each including corresponding current limiting units 121A-124A and corresponding adjusting units 121B-124B, are configured to regulate the currents flowing through the corresponding luminescent devices 21-24 according to the voltages $V_{AK1}$-$V_{AK4}$, respectively, wherein $I_{AK1}$-$I_{AK4}$ respectively represent the currents flowing through the current limiting units 121A-124A and $V_{AK1}$-$V_{AK4}$ respectively represent the voltages established across the current limiting units 121A-124A. In the third embodiment of the present invention, the barrier voltages of the current limiting units 121A-124A are smaller than the overall barrier voltages of the corresponding luminescent elements 21-24.

Figure 12:
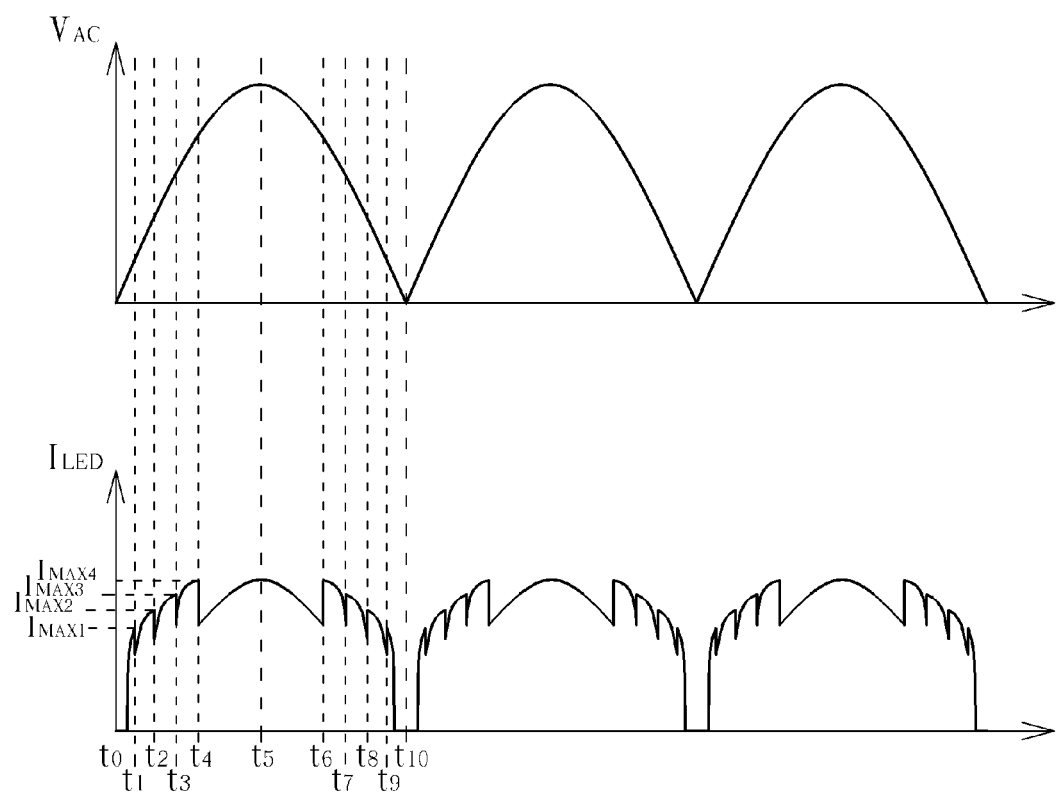

FIGS. 11A-11D and 12 illustrate the operation of the LED lighting device 300, wherein FIG. 11A-11D are diagrams illustrating the current-voltage charts of the current limiting units 121A-124A, and FIG. 12 is a diagram illustrating the variations in the related current and voltage when operating the LED lighting device 300. The adjusting units 121B-124B may provide flexible designs with various characteristics by adjusting the value of $I_{MAX}'$ when the two-terminal current controllers 121-124 operate in the second mode and the values of $V_{ON\_TH}'$ and $V_{OFF\_TH}'$ for switching between the second mode and the third mode. In the embodiment illustrated in FIGS. 11A-11D, $I_{MAX1} < I_{MAX2} < I_{MAX3} < I_{MAX4}$, $V_{ON\_TH1} < V_{ON\_TH2} < V_{ON\_TH3} < V_{ON\_TH4}$, and $V_{OFF\_TH1} < V_{OFF\_TH2} < V_{OFF\_TH3} < V_{OFF\_TH4}$.

FIG. 12 illustrates the waveforms of the voltage $V_{AC}$ and the current $I_{LED}$ when operating the LED lighting device 300. Since the value of the rectified AC voltage $V_{AC}$ varies periodically with time, a cycle between $t_0$-$t_{10}$ is used for illustration, wherein the period between $t_0$-$t_5$ is the rising period of the rectified AC voltage $V_{AC}$ and the period between $t_5$-$t_{10}$ is the falling period of the rectified AC voltage $V_{AC}$.

The operation of the LED lighting device 300 during the rising period $t_0$-$t_5$ is hereby explained. Between $t_0$-$t_1$ when the voltages $V_{AK1}$-$V_{AK4}$ increase with the rectified AC voltage $V_{AC}$, the two-terminal current controllers 121-124 are turned on earlier due to smaller barrier voltages, and the current flows from the power supply circuit 110 to the luminescent element 25 sequentially via the current limiting units 121A-124A (i.e., $I_{LED}=T_{AK1}=T_{AK2}=T_{AK3}=T_{AK4}$ and $I_{LED\_AK1}=I_{LED\_AK2}=I_{LED\_AK3}=I_{LED\_AK4}=0$). Between $t_1$-$t_2$ when the voltage $V_{AK1}$ is larger than the voltage $V_{OFF\_TH1}$, the two-terminal current controller 121 is turned off first, and the current flows from the power supply circuit 110 to the luminescent element 25 sequentially via the luminescent element 21 and the current limiting units 122A-124A (i.e., $I_{LED}=I_{LED\_AK1}=I_{AK2}=I_{AK3}=I_{AK4}$ and $I_{AK1}=I_{LED\_AK2}=I_{LED\_AK3}=I_{LED\_AK4}=0$). Between $t_2$-$t_3$ when the voltage $V_{AK2}$ is larger than the voltage $V_{OFF\_TH2}$, the two-terminal controller 122 is turned off next, and the current flows from the power supply circuit 110 to the luminescent element 25 sequentially via the luminescent element 21, the luminescent element 22 and the current limiting units 123A-124A (i.e., $I_{LED}=I_{LED\_AK1}=I_{LED\_AK2}=I_{AK3}=I_{AK4}$ and $I_{AK1}=I_{AK2}=I_{LED\_AK3}=I_{LED\_AK4}=0$). Between $t_3$-$t_4$ when the voltage $V_{AK3}$ is larger than the voltage $V_{OFF\_TH3}$, the two-terminal current controller 123 is turned off next, and the current flows from the power supply circuit 110 to the luminescent element 25 sequentially via the luminescent element 21, the luminescent element 22, the luminescent element 23 and the current limiting unit 124A (i.e., $I_{LED}=I_{LED\_AK1}=I_{LED\_AK2}=I_{LED\_AK3}=I_{AK4}$ and $I_{AK1}=I_{AK2}=I_{AK3}=I_{LED\_AK4}=0$). Between $t_4$-$t_5$ when the voltage $V_{AK4}$ is larger than the voltage $V_{OFF\_TH4}$, the two-terminal current controller 124 is turned off next, and the current flows from the power supply circuit 110 to the luminescent element 25 sequentially via the luminescent elements 21-24 (i.e., $I_{LED}=I_{LED\_AK1}=I_{LED\_AK2}=I_{LED\_AK3}=I_{LED\_AK4}$ and $I_{AK1}=I_{AK2}=I_{AK3}=I_{AK4}=0$). During the falling period $t_5$-$t_{10}$, when the voltages $V_{AK4}, V_{AK3}, V_{AK2}$ and $V_{AK1}$ sequentially drop below $V_{ON\_TH4}'$, $V_{ON\_TH3}'$, $V_{ON\_TH2}'$ and $V_{ON\_TH1}'$, respectively, the current limiting units 124A-121A are sequentially turned on at $t_6$-$t_9$, respectively. The operation of the LED lighting device 300 during the falling period $t_5$-$t_{10}$ is similar to that during the corresponding rising period $t_0$-$t_5$ as previously illustrated. In other words, during the same period, the luminescent element 25 has the longest conducting time, the luminescent element 21 has the second longest conducting time and the luminescent element 24 has the shortest conducting time. In many applications, the luminescent elements 21-24 may be required to provide different luminescence or become luminescent at different time. The present invention may thus provide flexible designs using the adjusting units 121B-124B.

Figure 13:
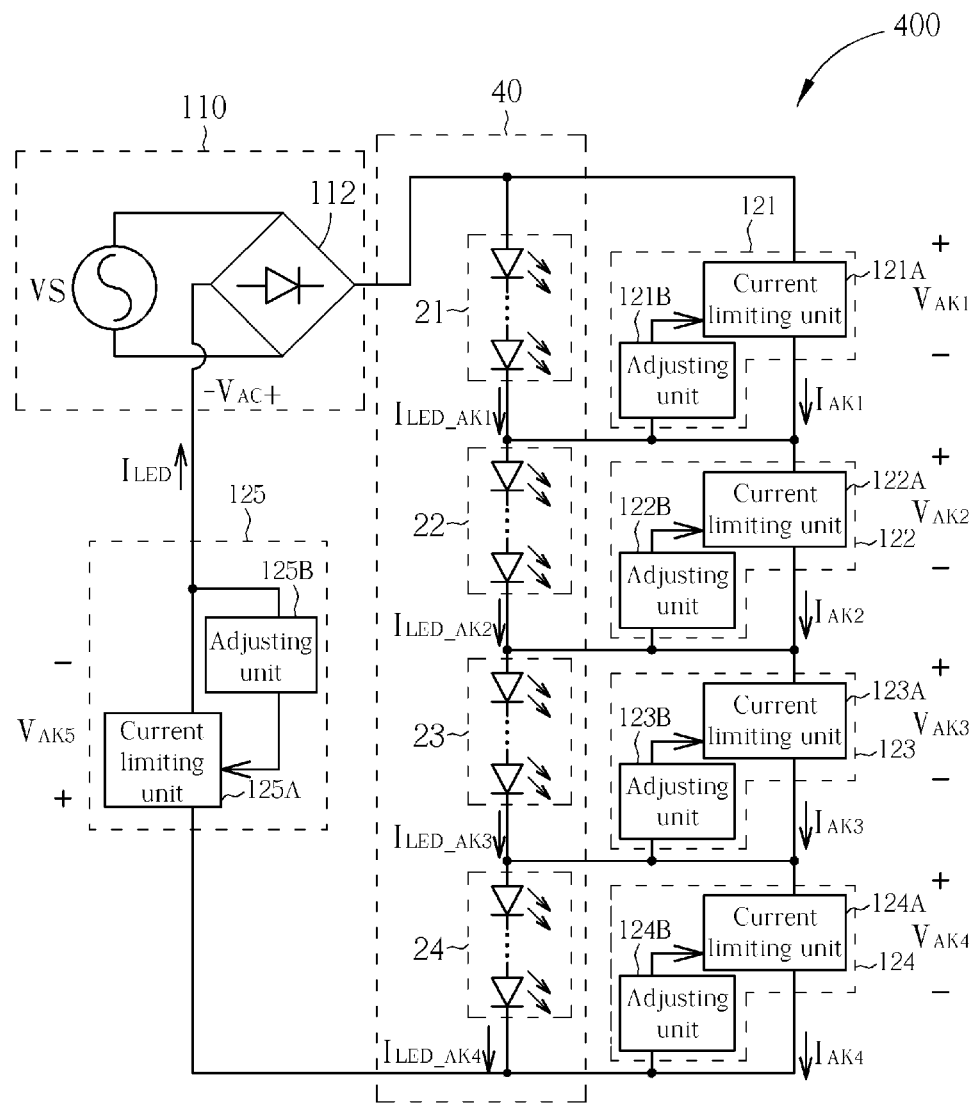

FIG. 13 is a diagram of an LED lighting device 400 according to a fourth embodiment of the present invention. The LED lighting device 400 includes a power supply circuit 110, a plurality of two-terminal current controllers, and a luminescent device 40. Having similar structure as the third embodiment, the LED lighting device 400 also include a plurality of two-terminal current controllers (5 two-terminal current controllers 121-125 are depicted in FIG. 13 for illustration) and a plurality of luminescent elements (4 luminescent elements 21-24 are depicted in FIG. 10 for illustration), but differ from the LED lighting device 300 in that the two-terminal current controllers 121-124 are each coupled in parallel to the corresponding luminescent elements 21-24 and the two-terminal current controller 125 is coupled in series to the luminescent elements 21-24.

Figure 14:
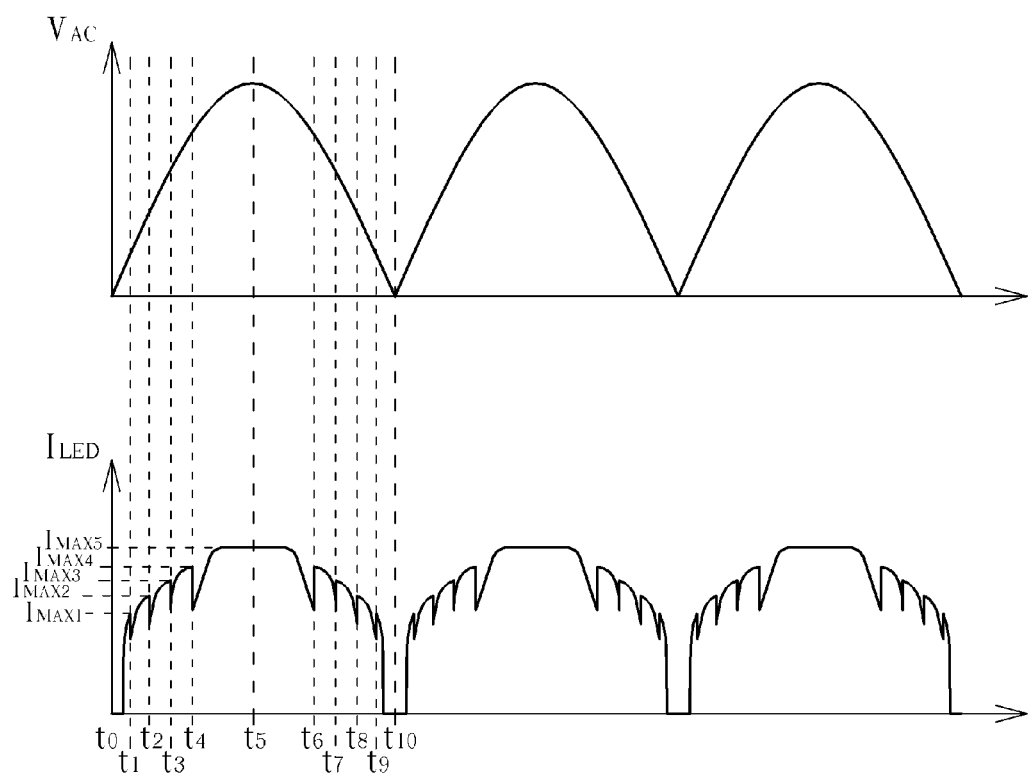

FIG. 14 shows the waveforms of the voltage and the current for illustrating the operation of the LED lighting device 400 according to the fourth embodiment of the present invention. As previously illustrated, the two-terminal current controllers 121-124 are turned off during $t_4$-$t_5$, and the current $I_{LED}$ passing through the luminescent elements 21-24 is determined by the rectified AC voltage $V_{AC}$ provided by the power supply circuit 110. In the third embodiment illustrated in FIGS. 10 and 12, if the power supply circuit 110 fails to provide stable output, the current $I_{LED}$ may exceed the maximum operational current of the luminescent elements 21-25 and thus cause permanent damages to the devices. Therefore, in the LED lighting device 40 according to the fourth embodiment of the present invention, the two-terminal current controller 125 is configured to maintain the current $I_{LED}$ to a specific value $I_{MAX5}$ which may be adjusted in various applications. The relationship between $I_{MAX1}$-$I_{MAX5}$ depicted in FIG. 14 is only for illustrative purpose.

Figure 15:
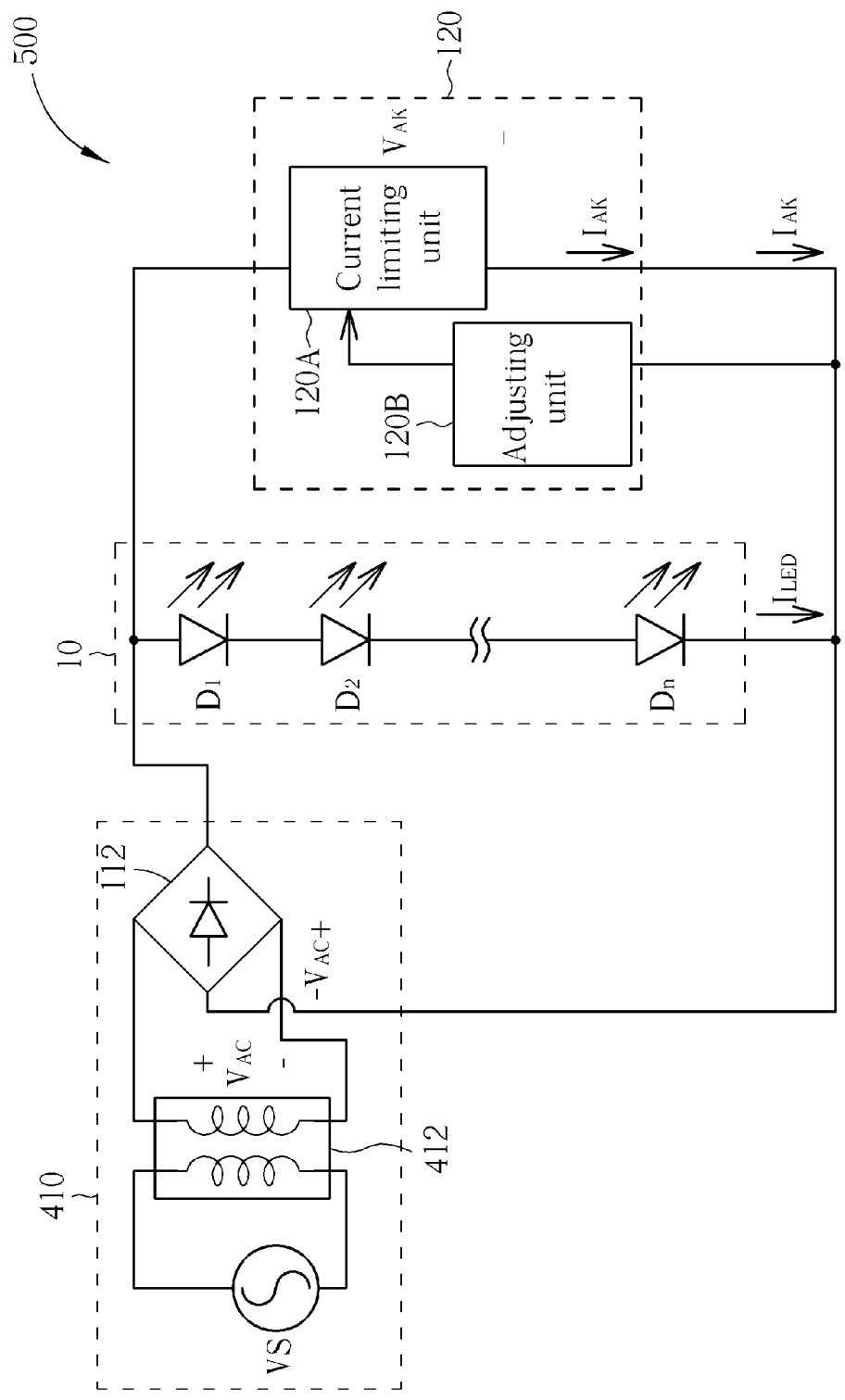

FIG. 15 is a diagram of an LED lighting device 500 according to a fifth embodiment of the present invention. The LED lighting device 500 includes a power supply circuit 410, a two-terminal current controller 120, and a luminescent device 10. Having similar structures, the first and fifth embodiments of the present invention differ in the power supply circuits. In the first embodiment of the present invention, the power supply circuit 110 is configured to rectify the AC voltage VS (such as 110-220V main) using the bridge rectifier 112, thereby providing the rectified AC voltage $V_{AC}$ whose value varies periodically with time. In the fifth embodiment of the present invention, the power supply circuit 410 is configured to receive any AC voltage VS, perform voltage conversion using an AC-AC converter 412, and rectify the converted AC voltage VS using the bridge rectifier 112, thereby providing the rectified AC voltage $V_{AC}$ whose value varies periodically with time. References may be also be made to FIGS. 5 and 6 for illustrating the operation of the LED lighting device 500. Similarly, the second to fourth embodiments of the present invention may also use the power supply circuit 410 for providing the rectified AC voltage $V_{AC}$.

Figure 16:
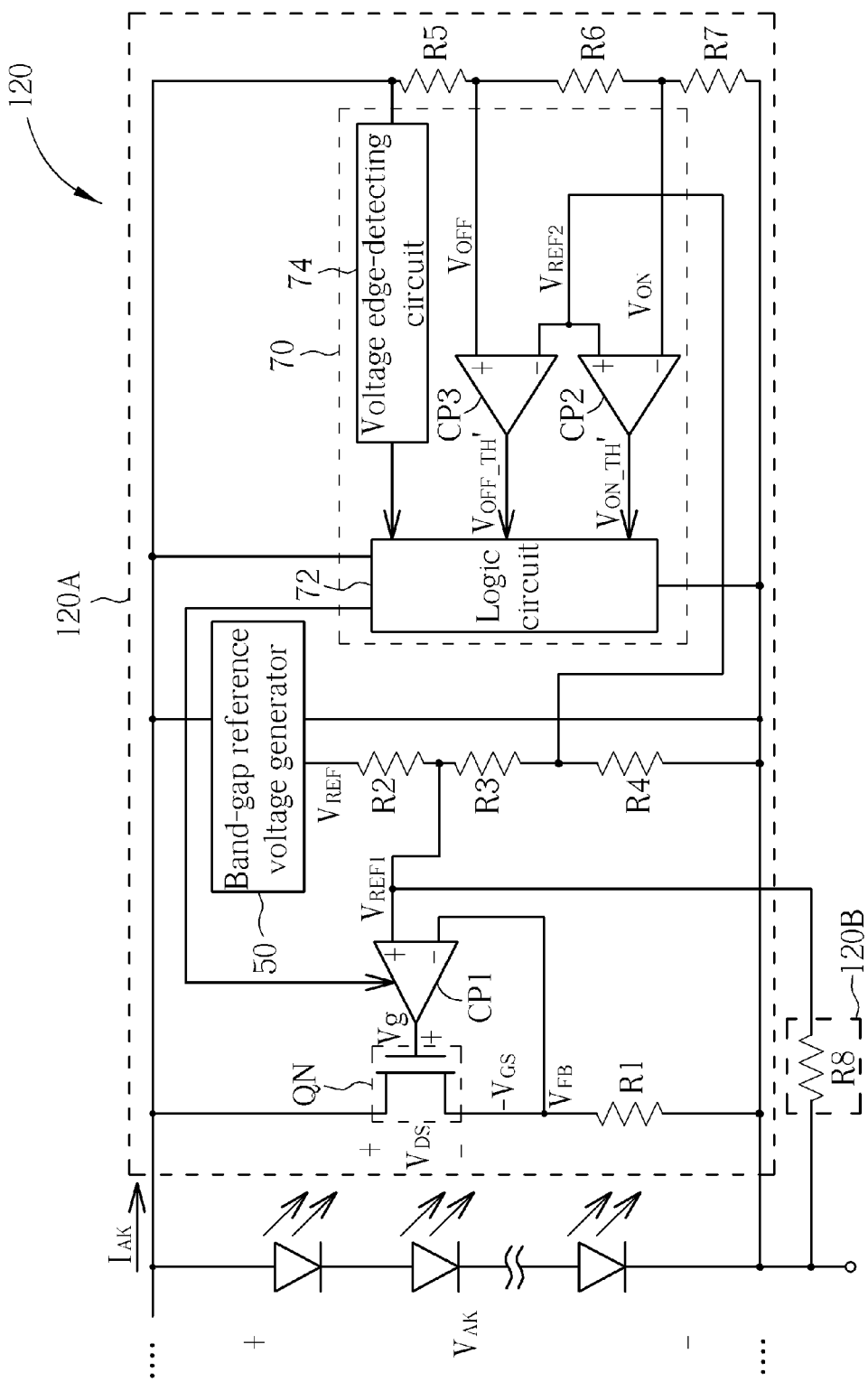
FIGS. 16 and 17 are diagrams of illustrated embodiments of the two-terminal current controller.
Figure 17:
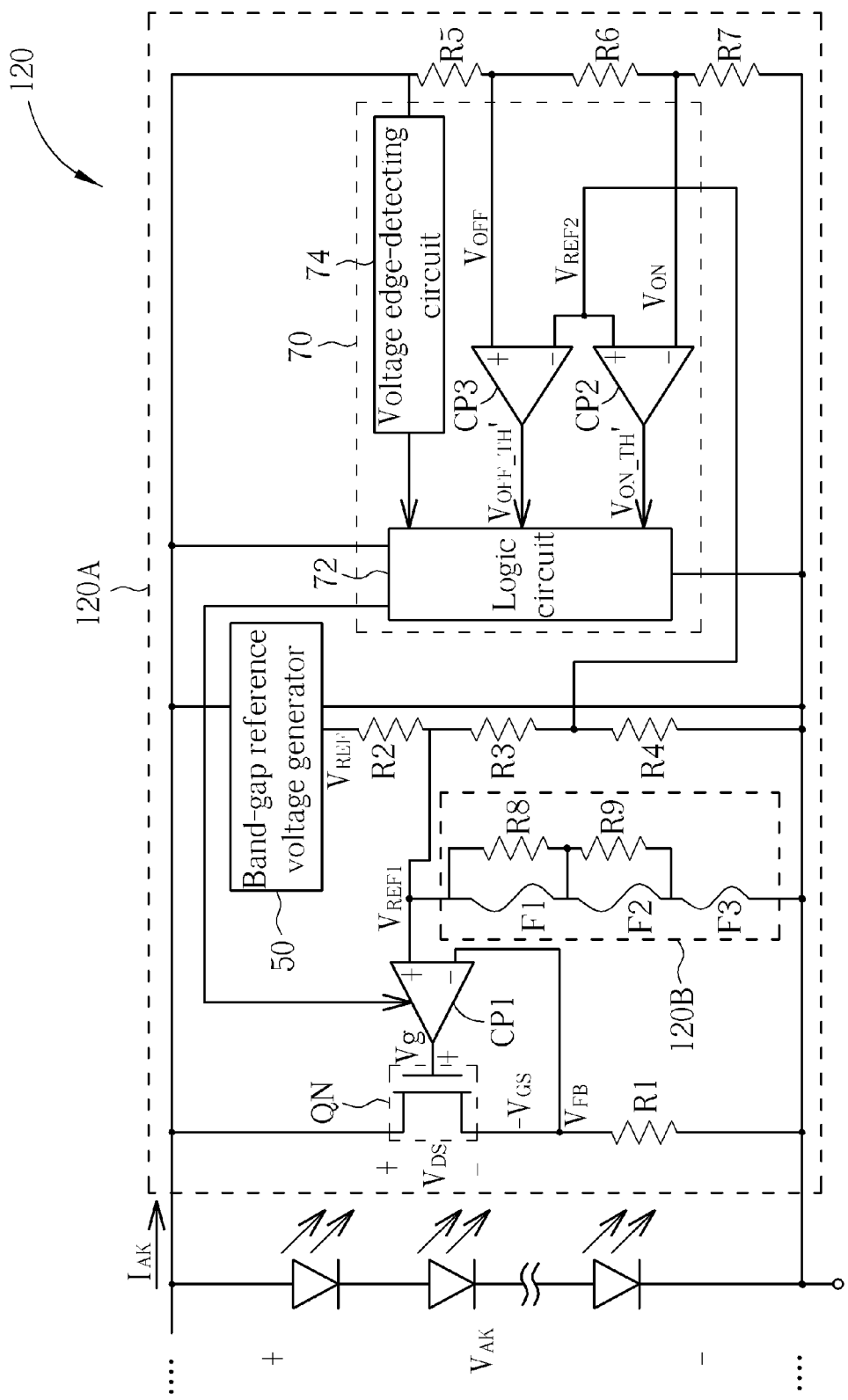

FIGS. 16 and 17 are diagrams of illustrated embodiments of the two-terminal current controller 120. In these two embodiments, the current limiting unit 120A of the two-terminal current controller 120 includes resistors R1-R7, a switch QN, a comparator CP1, a band-gap reference voltage generator 50, and a voltage-detecting circuit 70. The band-gap reference voltage generator 50 generally adopts devices having positive and negative temperature coefficients in order to achieve temperature-independent output characteristic, thereby providing a stable reference voltage $V_{REF}$.

The resistor R1 is used for detecting the current flowing through the switch QN, thereby providing a corresponding feedback voltage $V_{FB}$. The resistors R2-R4 forms a voltage-dividing circuit which provides a reference voltage $V_{REF1}$ and a reference voltage $V_{REF2}$ according to the reference voltage $V_{REF}$. The comparator CP1, having a positive input end for receiving the reference voltage $V_{REF1}$ and a negative input end for receiving the feedback voltage $V_{FB}$, is configured to output a control signal $V_g$ to the switch QN according to the relationship between the reference voltage $V_{REF1}$ and the feedback voltage $V_{FB}$.

The switch QN may include a field effect transistor (FET), a bipolar junction transistor (BJT) or other devices having similar function. In the embodiments illustrated in FIGS. 14 and 15, an N-type metal-oxide-semiconductor (NMOS) transistor is used for illustration. With the gate coupled to the comparator CP1 for receiving the control signal $V_g$, the drain-to-source voltage, the gate-to-source voltage and the threshold voltage of the switch QN are represented by $V_{DS}$, $V_{GS}$ and $V_{TH}$, respectively. When the switch QN operates in the linear region, its drain current is mainly determined by the drain-to-source voltage $V_{DS}$; when the switch QN operates in the saturation region, its drain current is only related to the gate-to-source voltage $V_{GS}$.

During the rising period of the rectified AC voltage $V_{AC}$, the drain-to-source voltage $V_{DS}$ of the switch QN increases with the voltage $V_{AK}$. When the voltage $V_{AK}$ does not exceed $V_{DROP}$, the drain-to-source voltage $V_{DS}$ is smaller than the difference between the gate-to-source voltage $V_{GS}$ and the threshold voltage $V_{TH}$ ($V_{DS} < V_{GS} - V_{TH}$). The comparator CP1 provides the control signal $V_g$ which allows the switch QN to operate in the linear region where the drain current is mainly determined by the drain-to-source voltage $V_{DS}$. In other words, the two-terminal current controller 120 is configured to provide the current $I_{AK}$ and voltage $V_{AK}$ whose relationship corresponds to the I-V characteristic of the switch QN when operating in the linear region.

During the rising period of the rectified AC voltage $V_{AC}$ when the $V_{DROP} < V_{AK} < V_{OFF\_TH}'$, the drain-to-source voltage $V_{DS}$ is larger than the difference between the gate-to-source voltage $V_{GS}$ and the threshold voltage $V_{TH}$ ($V_{DS} > V_{GS} - V_{TH}$). The comparator CP1 provides the control signal $V_g$ which results in $V_{GS} > V_{TH}$, thereby allowing the switch QN to operate in the saturation region. At this time, the drain current of the comparator CP1 is only related to the gate-to-source voltage $V_{GS}$. In other words, the current $I_{AK}$ does not change with the voltage $V_{AK}$.

The voltage-detecting circuit 70 includes a logic circuit 72, a voltage edge-detecting circuit 74, and two comparators CP2 and CP3. The comparator CP2, having a positive input end for receiving the reference voltage $V_{REF2}$ and a negative input end for receiving a voltage $V_{ON}$, is configured to output a control signal $V_{ON\_TH}'$ according to the relationship between the voltage $V_{ON}$ and the reference voltage $V_{REF2}$. The comparator CP3, having a positive input end for receiving a voltage $V_{OFF}$ and a negative input end for receiving the reference voltage $V_{REF2}$, is configured to output a control signal $V_{OFF\_TH}'$ according to the relationship between the voltage $V_{OFF}$ and the reference voltage $V_{REF2}$.

The comparator CP2 may determine the relationship between the voltages $V_{AK}$ and $V_{ON\_TH}'$, while the comparator CP3 may determine the relationship between the voltages $V_{AK}$ and $V_{OFF\_TH}'$. Meanwhile, when the voltages $V_{AK}$ is between $V_{OFF\_TH}'$ and $V_{ON\_TH}'$, the voltage edge-detecting circuit 74 is configured to determine whether the rectified AC voltage $V_{AC}$ is during the rising period or during the falling period. Based on the results of the voltage edge-detecting circuit 74 and the comparators CP2 and CP3, the logic circuit 72 outputs a corresponding control signal to the comparator CP1. During the rising period of the rectified AC voltage $V_{AC}$ when the voltage $V_{AK}$ is between $V_{OFF\_TH}'$ and $V_{ON\_TH}'$, the comparator CP1 provides the control signal $V_g$ smaller than the threshold voltage $V_{TH}$, thereby turning off the switch QN and maintaining the current $I_{AK}$ at zero. During the falling period of the rectified AC voltage $V_{AC}$ when the voltage $V_{AK}$ is between $V_{ON\_TH}'$ and $V_{OFF\_TH}'$, the comparator CP1 provides the control signal $V_g$ larger than the threshold voltage $V_{TH}'$, thereby operating the switch QN in the saturation region and maintaining the current $I_{AK}$ at $I_{MAX}'$.

In the embodiment illustrated in FIG. 16, the adjusting unit 120B includes a resistor R8 whose value may be varied for adjusting how the reference voltage $V_{REF}$ is provided to the comparators CP1-CP3 by voltage division. In other words, the values of the reference voltages $V_{REF1}$ and $V_{REF2}$ may be adjusted flexibly. As previously illustrated, the comparator CP1 is configured to output the control signal $V_g$ to the switch QN according to the relationship between the reference voltage $V_{REF1}$ and the feedback voltage $V_{FB}$, the comparator CP2 is configured to output the control signal $V_{ON\_TH}'$ according to the relationship between the voltage $V_{ON}$ and the reference voltage $V_{REF2}$, and the comparator CP3 is configured to output the control signal $V_{OFF\_TH}'$ according to the relationship between the voltage $V_{OFF}$ and the reference voltage $V_{REF2}$. Since the drain current of the switch QN is only related to the gate-to-source voltage $V_{GS}$ when operating in the saturation region, the values of the current $I_{MAX}'$ (when the two-terminal current controller 120 operates in the second mode) and the voltages $V_{ON\_TH}'$ and $V_{OFF\_TH}'$ (for switching between the second and third modes) may be adjusted using the adjusting unit 120B. Therefore, the present invention can provide flexible designs with various characteristics.

In the embodiment illustrated in FIG. 17, the adjusting unit 120B includes resistors R8-R9 and fuses F1-F3. The resistors R8-R9 may be coupled to the resistors R3 and R4 in many ways by laser-burning or current-burning the fuses F1-F3, thereby adjusting the equivalent resistance when performing voltage division. For example, the resistor R8 may be coupled in parallel with the resistor string R3+R4 by burning the fuse F1 alone, the resistor string R8+R9 may be coupled in parallel with the resistor string R3+R4 by burning the fuses F1 and F2 alone, and no extra resistor is coupled in parallel with the resistor string R3+R4 by burning the fuse F3 alone. The present invention may adopt other resistor-fuse configurations, with resistors coupled in series or in parallel, as long as similar results can be achieved. Therefore, the present invention may adjust how the reference voltage $V_{REF}$ is provided to the comparators CP1-CP3 by voltage division. In other words, the values of the reference voltages $V_{REF1}$ and $V_{REF2}$ may be adjusted flexibly. As previously illustrated, the comparator CP1 is configured to output the control signal $V_g$ to the switch QN according to the relationship between the reference voltage $V_{REF1}$ and the feedback voltage $V_{FB}$, the comparator CP2 is configured to output the control signal $V_{ON\_TH}'$ according to the relationship between the voltage $V_{ON}$ and the reference voltage $V_{REF2}$, and the comparator CP3 is configured to output the control signal $V_{OFF\_TH}'$ according to the relationship between the voltage $V_{OFF}$ and the reference voltage $V_{REF2}$. Since the drain current of the switch QN is only related to the gate-to-source voltage $V_{GS}$ when operating in the saturation region, the values of the current $I_{MAX}'$ (when the two-terminal current controller 120 operates in the second mode) and the voltages $V_{ON\_TH}'$ and $V_{OFF\_TH}'$ (for switching between the second and third modes) may be adjusted using the adjusting unit 120B. Therefore, the present invention can provide flexible designs with various characteristics.

In the embodiment illustrated in FIG. 16, the user may adjust the current. In the embodiment illustrated in FIG. 17, manufacturer of the two-terminal current controller may adjust the current for the user. For example, the adjusting unit may be integrated in an IC of the two-terminal current controller. Built-in resistors and laser-burning are well-know to those skilled in the art. FIGS. 15 and 16 are merely for illustrative purpose and do not limit the scope of the present invention.

In the LED lighting devices 100, 200, 300, 400 and 500 of the present invention, the number of the two-terminal current controllers 120-125, the number and configuration of the luminescent elements 21-25, and the type of the power supply circuits 110 and 410 may be determined according to different applications. FIGS. 4, 7, 10 and 12 are merely for illustrative purpose and do not limit the scope of the present invention. Also, the two-terminal current controller 120 depicted in FIG. 16 is an embodiment of the present invention and may be substituted by devices which are able to provide characteristics as shown in FIGS. 5, 6, 8, 9 and 11A-11D.

The LED lighting device of the present invention regulates the current flowing through the serially-coupled light-emitting diodes and controls the number of the turned-on light-emitting diodes using a two-terminal current controller. Some of the light-emitting diodes may be conducted before the rectified AC voltage reaches the overall barrier voltage of all light-emitting diodes for improving the power factor. Therefore, the present invention may provide lighting devices having large effective operational voltage range and high brightness.

Those skilled in the art will readily observe that numerous modifications and alterations of the device and method may be made while retaining the teachings of the invention.

What is claimed is:

1. A light-emitting diode (LED) lighting device, comprising:
a luminescent device configured to provide light according to a first current;
a two-terminal current controller coupled in parallel with the luminescent device and configured to regulate the first current according to a voltage established across the luminescent device, wherein:
during a rising period of a rectified alternative-current (AC) voltage when the voltage established across the luminescent device does not exceed a first voltage, the two-terminal current controller operates in a first mode;
during the rising period when the voltage established across the luminescent device exceeds the first voltage but does not exceed a second voltage, the two-terminal current controller operates in a second mode;
during the rising period when the voltage established across the luminescent device exceeds the second voltage, the two-terminal current controller operates in a third mode; and
the two-terminal current controller includes:
a current limiting unit configured to:
conduct a second current associated with the rectified AC voltage, regulate the second current according to the voltage established across the luminescent device and maintain the first current at zero when the two-terminal current controller operates in the first mode;
conduct the second current, maintain the second current at a first predetermined value larger than zero and maintain the first current at zero when the two-terminal current controller operates in the second mode; and
switch off when the two-terminal current controller operates in the third mode; and
an adjusting unit configured to adjust the first predetermined value and the second voltage.

2. The LED lighting device of claim 1, wherein during a falling period of the rectified AC voltage when the voltage established across the luminescent device is between the first voltage and a third voltage larger than the second voltage, the two-terminal current controller operates in the second mode in which the current limiting unit is configured to conduct the second current, maintain the second current at the first predetermined value and maintain the first current at zero.

3. The LED lighting device of claim 2, wherein the current limiting unit comprises:
a switch configured to conduct the second current according to a control signal;
a band-gap reference voltage generator configured to provide a band-gap reference voltage;
a first voltage-dividing circuit configured to provide a first reference voltage and a second reference voltage by voltage-dividing the band-gap reference voltage;
a second voltage-dividing circuit configured to provide a fourth voltage and a fifth voltage by voltage-dividing the rectified AC voltage;
a current-detecting circuit coupled in series to the switch and configured to detect the second current and provide a corresponding feedback voltage;
a voltage edge-detecting circuit configured to determine whether the rectified AC voltage is during the rising period or the falling period;
a first comparator configured to provide the control signal according to a relationship between the first reference voltage and the feedback voltage, the second voltage, the third voltage and a determining result of the voltage edge-detecting circuit;

a second comparator configured to provide the second voltage according to a relationship between the second reference voltage and the fourth voltage; and a third comparator configured to provide the third voltage according to a relationship between the second reference voltage and the fifth voltage.

4. The LED lighting device of claim 3, wherein the adjusting unit includes:

a resistor coupled in parallel with the first voltage-dividing circuit for adjusting the first reference voltage and the second reference voltage.

5. The LED lighting device of claim 3, wherein the adjusting unit includes:

a resistor; and a fuse coupled in parallel with the resistor for coupling the resistor in parallel with the first voltage-dividing circuit when burned, thereby adjusting the first reference voltage and the second reference voltage.

6. The LED lighting device of claim 3, wherein the adjusting unit includes:

a resistor; and a fuse coupled in series to the resistor for coupling the resistor in parallel with the first voltage-dividing circuit when unburned, thereby adjusting the first reference voltage and the second reference voltage.

7. The LED lighting device of claim 3, wherein:

during the falling period when the voltage established across the luminescent device does not exceed the first voltage, the switch is configured to regulate the second current according to the control signal; and during the falling period when the voltage established across the luminescent device exceeds the first voltage but does not exceed the third voltage, the switch is configured to maintain the second current at the first predetermined value according to the control signal and maintain the first current at zero.

8. The LED lighting device of claim 7, wherein the two-terminal current controller is configured to regulate the second current according to the voltage established across the luminescent device, so that a relationship between the voltage established across the luminescent device and the second current matches a characteristic when the switch operates in a specific operational region.

9. The LED lighting device of claim 1, wherein the current limiting unit comprises:

a switch configured to conduct the second current according to a control signal;

a band-gap reference voltage generator configured to provide a band-gap reference voltage;

a first voltage-dividing circuit configured to provide a first reference voltage and a second reference voltage by voltage-dividing the band-gap reference voltage;

a second voltage-dividing circuit configured to provide a fourth voltage and a fifth voltage by voltage-dividing the rectified AC voltage;

a current-detecting circuit coupled in series to the switch and configured to detect the second current and provide a corresponding feedback voltage;

a voltage edge-detecting circuit configured to determine whether the rectified AC voltage is during the rising period or the falling period;

a first comparator configured to provide the control signal according to a relationship between the first reference voltage and the feedback voltage, the second voltage, the third voltage and a determining result of the voltage edge-detecting circuit; and a second comparator configured to provide the second voltage according to a relationship between the second reference voltage and the fourth voltage.

10. The LED lighting device of claim 9, wherein the adjusting unit includes:

a resistor coupled in parallel with the first voltage-dividing circuit for adjusting the first reference voltage and the second reference voltage.

11. The LED lighting device of claim 9, wherein the adjusting unit includes:

a resistor; and a fuse coupled in parallel with the resistor for coupling the resistor in parallel with the first voltage-dividing circuit when burned and bypassing the resistor when unburned, thereby adjusting the first reference voltage and the second reference voltage.

12. The LED lighting device of claim 9, wherein the adjusting unit includes:

a resistor; and a fuse coupled in series to the resistor for coupling the resistor in parallel with the first voltage-dividing circuit when unburned, thereby adjusting the first reference voltage and the second reference voltage.

13. The LED lighting device of claim 9, wherein:

during the rising period when the voltage established across the luminescent device does not exceed the first voltage, the switch is configured to regulate the second current according to the control signal; and during the rising period when the voltage established across the luminescent device exceeds the first voltage, the switch is configured to maintain the second current at the first predetermined value according to the control signal.

14. The LED lighting device of claim 1, wherein a barrier voltage for turning on the two-terminal current controller is smaller than a barrier voltage for turning on the luminescent device.

15. The LED lighting device of claim 1, further comprising:

n luminescent devices coupled in series and each configured to provide light according to a corresponding first current; and n two-terminal current controllers, each corresponding two-terminal current controller coupled in parallel with a corresponding luminescent device among the n luminescent devices and configured to regulate the corresponding first current according to a voltage established across the corresponding luminescent device, wherein:

during the rising period when the voltage established across the corresponding luminescent device does not exceed the first voltage, the corresponding two-terminal current controller operates in the first mode;

during the rising period when the voltage established across the corresponding luminescent device exceeds the first voltage but does not exceed the second voltage, the corresponding two-terminal current controller operates in the second mode; and during the rising period when the voltage established across the corresponding luminescent device exceeds the second voltage, the corresponding two-terminal current controller operates in the third mode.

16. The LED lighting device of claim 15, further comprising:
an (n+1)th two-terminal current controller coupled in series to the n luminescent devices and comprising:
an (n+1)th current limiting unit configured to maintain the first current at a second predetermined value larger than zero when the n two-terminal current controllers are turned off; and
an (n+1)th adjusting unit configured to adjust the second predetermined value.

17. A two-terminal current controller for controlling a first current passing through a load, wherein:
during a rising period of a rectified AC voltage when a voltage established across the load does not exceed a first voltage, the two-terminal current controller operates in a first mode;
during the rising period when the voltage established across the load exceeds the first voltage but does not exceed a second voltage, the two-terminal current controller operates in a second mode; and
during the rising period when the voltage established across the load exceeds the second voltage, the two-terminal current controller operates in a third mode; and
the two-terminal current controller includes:
a current limiting unit configured to:
conduct a second current associated with the rectified AC voltage, regulate the second current according to the voltage established across the load and maintain the first current at zero when the two-terminal current controller operates in the first mode;
conduct the second current, maintain the second current at a predetermined value larger than zero and maintain the first current at zero when the two-terminal current controller operates in the second mode; and
switch off when the two-terminal current controller operates in the third mode; and
an adjusting unit configured to adjust the predetermined value and the second voltage.

18. The two-terminal current controller of claim 17, wherein during a falling period of the rectified AC voltage when the voltage established across the load is between the first voltage and a third voltage larger than the second voltage, the two-terminal current controller operates in the second mode in which the current limiting unit is configured to conduct the second current, maintain the second current at the predetermined value and maintain the first current at zero.

19. The two-terminal current controller of claim 18, wherein the current limiting unit comprises:
a switch configured to conduct the second current according to a control signal;
a band-gap reference voltage generator configured to provide a band-gap reference voltage;
a first voltage-dividing circuit configured to provide a first reference voltage and a second reference voltage by voltage-dividing the band-gap reference voltage;
a second voltage-dividing circuit configured to provide a fourth voltage and a fifth voltage by voltage-dividing the rectified AC voltage;
a current-detecting circuit coupled in series to the switch and configured to detect the second current and provide a corresponding feedback voltage;
a voltage edge-detecting circuit configured to determine whether the rectified AC voltage is during the rising period or the falling period;
a first comparator configured to provide the control signal according to a relationship between the first reference voltage and the feedback voltage, the second voltage, the third voltage and a determining result of the voltage edge-detecting circuit;
a second comparator configured to provide the second voltage according to a relationship between the second reference voltage and the fourth voltage; and
a third comparator configured to provide the third voltage according to a relationship between the second reference voltage and the fifth voltage.

20. The two-terminal current controller of claim 19, wherein the adjusting unit includes:
a resistor; and
a fuse coupled in parallel with the resistor for coupling the resistor in parallel with the first voltage-dividing circuit when burned, thereby adjusting the first reference voltage and the second reference voltage.

21. The two-terminal current controller of claim 19, wherein the adjusting unit includes:
a resistor; and
a fuse coupled in series to the resistor for coupling the resistor in parallel with the first voltage-dividing circuit when unburned, thereby adjusting the first reference voltage and the second reference voltage.

22. The two-terminal current controller of claim 19, wherein:
during the falling period when the voltage established across the load does not exceed the first voltage, the switch is configured to regulate the second current according to the control signal; and
during the falling period when the voltage established across the load exceeds the first voltage but does not exceed the third voltage, the switch is configured to maintain the second current at the predetermined value according to the control signal and maintain the first current at zero.

23. The two-terminal current controller of claim 22, wherein the two-terminal current controller is configured to regulate the second current according to the voltage established across the load, so that a relationship between the voltage established across the load and the second current matches a characteristic when the switch operates in a specific operational region.

24. The two-terminal current controller of claim 17, wherein the current limiting unit comprises:
a switch configured to conduct the second current according to a control signal;
a band-gap reference voltage generator configured to provide a band-gap reference voltage;
a first voltage-dividing circuit configured to provide a first reference voltage and a second reference voltage by voltage-dividing the band-gap reference voltage;
a second voltage-dividing circuit configured to provide a fourth voltage and a fifth voltage by voltage-dividing the rectified AC voltage;
a current-detecting circuit coupled in series to the switch and configured to detect the second current and provide a corresponding feedback voltage;
a voltage edge-detecting circuit configured to determine whether the rectified AC voltage is during the rising period or the falling period;
a first comparator configured to provide the control signal according to a relationship between the first reference voltage and the feedback voltage, the second voltage, the third voltage and a determining result of the voltage edge-detecting circuit; and a second comparator configured to provide the second voltage according to a relationship between the second reference voltage and the fourth voltage.

25. The two-terminal current controller of claim 24, wherein the adjusting unit includes:
a resistor; and
a fuse coupled in parallel with the resistor for coupling the resistor in parallel with the first voltage-dividing circuit when burned and bypassing the resistor when unburned, thereby adjusting the first reference voltage and the second reference voltage.

26. The two-terminal current controller of claim 24, wherein the adjusting unit includes:
a resistor; and
a fuse coupled in series to the resistor for coupling the resistor in parallel with the first voltage-dividing circuit when unburned, thereby adjusting the first reference voltage and the second reference voltage.

27. The two-terminal current controller of claim 24, wherein:
during the rising period when the voltage established across the load does not exceed the first voltage, the switch is configured to regulate the second current according to the control signal; and
during the rising period when the voltage established across the load exceeds the first voltage, the switch is configured to maintain the second current at the predetermined value according to the control signal.

28. The two-terminal current controller of claim 17, wherein a barrier voltage for turning on the two-terminal current controller is smaller than a barrier voltage for turning on the load.

* * * * *